United States Patent
Cha et al.

(10) Patent No.: US 8,914,636 B2
(45) Date of Patent: Dec. 16, 2014

(54) AUTOMATED NEGOTIATION AND SELECTION OF AUTHENTICATION PROTOCOLS

(75) Inventors: Inhyok Cha, Gangham-Ku (KR); Andreas Leicher, Frankfurt (DE); Andreas Schmidt, Frankfurt am Main (DE); Louis J. Guccione, East Chester, NY (US); Yogendra C. Shah, Exton, PA (US); Yousif Targali, Cliffwood, NJ (US)

(73) Assignee: InterDigital Patent Holdings, Inc., Wilmington, DE (US)

(*) Notice: Subject to any disclaimer, the term of this patent is extended or adjusted under 35 U.S.C. 154(b) by 0 days.

(21) Appl. No.: 13/535,563

(22) Filed: Jun. 28, 2012

(65) Prior Publication Data

US 2013/0174241 A1    Jul. 4, 2013

Related U.S. Application Data

(60) Provisional application No. 61/588,482, filed on Jan. 19, 2012, provisional application No. 61/502,207, filed on Jun. 28, 2011.

(51) Int. Cl.
*H04L 29/06* (2006.01)
*H04W 12/06* (2009.01)
*H04L 9/32* (2006.01)
*H04L 12/28* (2006.01)

(52) U.S. Cl.
CPC . *H04L 63/08* (2013.01); *H04L 9/32* (2013.01); *H04L 63/102* (2013.01); *H04L 12/2856* (2013.01); *H04L 63/205* (2013.01); *H04L 23/0815* (2013.01); *H04W 12/06* (2013.01)
USPC .............................. 713/171; 726/5

(58) Field of Classification Search
CPC ...... H04L 63/126; H04L 12/2856; H04L 9/32
USPC .................................................. 726/7
See application file for complete search history.

(56) References Cited

U.S. PATENT DOCUMENTS

2003/0212912 A1* 11/2003 Bajko et al. ............... 713/202
2004/0128558 A1   7/2004 Barrett
(Continued)

FOREIGN PATENT DOCUMENTS

EP           1 860 906      11/2007
WO        WO 03/100544     12/2003

OTHER PUBLICATIONS

3 GPP TR 33.924 V9.4.0, "Identity management and Generic Authentication Architecture (GAA) Interworking (Release 9)," available at http://www.3gpp.org/ftp/Specs/archive/33_series/33.924/, Jun. 2011, 40 pages.

(Continued)

*Primary Examiner* — Hadi Armouche
*Assistant Examiner* — Bryan Wright
(74) *Attorney, Agent, or Firm* — Baker & Hostetler LLP

(57) ABSTRACT

Wireless telecommunications networks may implement various forms of authentication. There are a variety of different user and device authentication protocols that follow a similar network architecture, involving various network entities such as a user equipment (UE), a service provider (SP), and an authentication endpoint (AEP). To select an acceptable authentication protocol or credential for authenticating a user or UE, authentication protocol negotiations may take place between various network entities. For example, negotiations may take place in networks implementing a single-sign on (SSO) architecture and/or networks implementing a Generic Bootstrapping Architecture (GBA).

18 Claims, 18 Drawing Sheets

(56) References Cited

U.S. PATENT DOCUMENTS

| | | | |
|---|---|---|---|
| 2005/0210252 A1* | 9/2005 | Freeman et al. | 713/171 |
| 2006/0153221 A1* | 7/2006 | Huang | 370/437 |
| 2008/0039096 A1* | 2/2008 | Forsberg | 455/438 |
| 2008/0291883 A1* | 11/2008 | Seok | 370/338 |
| 2008/0295157 A1* | 11/2008 | Wong et al. | 726/5 |
| 2009/0328140 A1* | 12/2009 | McPherson et al. | 726/2 |
| 2010/0146262 A1* | 6/2010 | Zhang | 713/155 |
| 2010/0211786 A1* | 8/2010 | Lim et al. | 713/169 |
| 2010/0262703 A1 | 10/2010 | Faynberg et al. | |
| 2011/0258447 A1* | 10/2011 | Wei et al. | 713/168 |
| 2011/0271330 A1* | 11/2011 | Zhang | 726/5 |
| 2012/0102315 A1* | 4/2012 | Holtmanns et al. | 713/150 |

OTHER PUBLICATIONS

3G Americas, "Security and Trust in Mobile Applications," http://www.4gamericas.org/userfiles/File/3g_Americas_Security_and_Trust_in_Mobile_Applications_October_2008.pdf, Oct. 2008, 29 pages.

3GPP TR 22.895 V1.0.0, "Study on Service aspects of integration of Single Sign-On (SSO) frameworks with 3GPP operator-controlled resources and mechanisms (Release 11)," available at http://www.3gpp.org/ftp/Specs/html-info/22895.htm, Sep. 2011, 16 pages.

3GPP TR 33.914 V1.0.0, "Single Sign on Application Security for Common IMS—based on SIP Digest (Release 11)," available at http://www.3gpp.org/ftp/Specs/archive/33_series/33.914/, May 2011, 37 pages.

3GPP TR 33.914 V2.0.0, "Single Sign on Application Security for Common IMS—based on SIP Digest (Release 11)," available at http://www.3gpp.org/ftp/Specs/archive/33_series/33.914/, Feb. 2012, 48 pages.

3GPP TR 33.924 V10.0.0, "Identity management and Generic Authentication Architecture (GAA) interworking (Release 10)," available at http://www.3gpp.org/ftp/Specs/html-info/33924.htm, Mar. 2011, 39 pages.

3GPP TR 33.924 V10.1.0, "Identity management and Generic Authentication Architecture (GAA) interworking (Release 10)," available at http://www.3gpp.org/ftp/Specs/archive/33_series/33.924/, Jun. 2011, 40 pages.

3GPP TS 31.102 V10.2.0, "Characteristics of the Universal Subscriber Identity Module (USIM) application (Release 10)," available at http://www.3gpp.org/ftp/Specs/html-info/31102.htm, Jun. 2011, 227 pages.

3GPP TS 31.103 V10.1.0, "Characteristics of the IP Multimedia Services Identity Module (ISIM) application (Release 10)," available at http://www.3gpp.org/ftp/Specs/html-info/31103.htm, Apr. 2011, 43 pages.

3GPP TS 33.102 V10.0.0, "3G security; Security architecture (Release 10)," available at http://www.3gpp.org/ftp/Specs/html-info/33102.htm, Dec. 2010, 72 pages.

3GPP TS 33.220 V10.0.0, "Generic Authentication Architecture (GAA); Generic Bootstrapping Architecture (GBA) (Release 10)," available at http://www.3gpp.org/ftp/Specs/html-info/33220.htm, Oct. 2010, 75 pages.

3GPP TS 33.220 V11.2.0, "Generic Authentication Architecture (GAA); Generic Bootstrapping Architecture (GBA) (Release 11)," available at http://www.3gpp.org/ftp/Specs/archive/33_series/33.220/, Mar. 2012, 91 pages.

3GPP TS 33.221 V10.0.0, "Generic Authentication Architecture (GAA); Support for subscriber certificates (Release 10)," available at http://www.3gpp.org/ftp/Specs/archive/33_series/33.221/, Mar. 2011, 25 pages.

3GPP TS 33.222 V10.0.0, "Generic Authentication Architecture (GAA); Access to network application functions using Hypertext Transfer Protocol over Transport Layer Security (HTTPS) (Release 10)," available at http://www.3gpp.org/ftp/Specs/html-info/33222.htm, Oct. 2010, 22 pages.

3GPP TS 33.222 V11.0.0, "Generic Authentication Architecture (GAA); Access to network application functions using Hypertext Transfer Protocol over Transport Layer Security (HTTPS) (Release 11)," available at http://www.3gpp.org/ftp/Specs/archive/33_series/33.222/, Mar. 2012, 22 pages.

3GPP2 S.S0109-0 V1.0, "Generic Bootstrapping Architecture (GBA) Framework," Mar. 30, 2006, 59 pages.

Burr et al., Ed., "Electronic Authentication Guideline," Version 1.0.2, http://csrc.nist.gov/publications/nistpubs/800-63/SP800-63V1_0_2.pdf, Apr. 2006, 64 pages.

Fielding et al., "Hypertext Transfer Protocol—HTTP/1.1," IETF RFC 2616, http://www.ietf.org/rfc/rfc2616.txt, Jun. 1999, 165 pages.

Franks et al., "HTTP Authentication: Basic and Digest Access Authentication," IETF RFC 2617, http://www.ietf.org/rfc/rfc2617.txt, Jun. 1999, 32 pages.

International Patent Application No. PCT/US2012/035540: International Search Report and Written Opinion dated Aug. 22, 2012, 13 pages.

International Patent Application No. PCT/US2012/044543: International Search Report and Written Opinion dated Sep. 12, 2012, 15 pages.

Klyne et al., "Date and Time on the Internet: Timestamps," IETF RFC 3339, http://www.ietf.org/rfc/rfc3339.txt, Jul. 2002, 17 pages.

Miller, J., Ed., "Yadis Specification Version 1.0," http://yadis.org/papers/yadis-v1.0.pdf, Mar. 18, 2006, 22 pages.

Niemi et al., "Hypertext Transfer Protocol (HTTP) Digest Authentication Using Authentication and Key Agreement (AKA)," IETF RFC 3310, http://www.ietf.org/rfc/rfc3310.txt, Sep. 2002, 17 pages.

Recordon, D., "OpenID Provider Authentication Policy Extension 1.0—Draft 1," http://openid.net/specs/openid-provider-authentication-policy-extension-1_0-01.html, Jun. 22, 2007, 10 pages.

Recordon, D., "OpenID Provider Authentication Policy Extension 1.0—Draft 2," http://openid.net/specs/openid-provider-authentication-policy-extension-1_0-02.html, Oct. 23, 2007, 10 pages.

Rosenberg et al., "SIP: Session Initiation Protocol," IETF RFC 3261, http://tools.ietf.org/html/rfc3261, Jun. 2002, 269 pages.

Schmidt et al., "Efficient Application Single-Sign-On for Evolved Mobile Networks," Proceedings of the Wireless World Research Forum Meeting 25, Nov. 2010, 1-6.

specs@openid.net, "OpenID Authentication 2.0—Final," http://openid.net/specs/openid-authentication-2_0.html, Dec. 5, 2007, 36 pages.

Thanh et al., "Authentication in a multi-access IMS environment," IEEE International Conference on Wireless & Mobile Computing, Networking & Communication, Oct. 2008, 613-618.

* cited by examiner

AUTOMATED NEGOTIATION AND SELECTION OF AUTHENTICATION PROTOCOLS

CROSS REFERENCE TO RELATED APPLICATIONS

This application claims the benefit of U.S. Provisional Patent Application Ser. No. 61/502,207 filed Jun. 28, 2011, and U.S. Provisional Patent Application Ser. No. 61/588,482 filed Jan. 19, 2012, the contents of which are hereby incorporated by reference in their entireties.

BACKGROUND

Wireless telecommunications networks may implement various forms of authentication. There are a variety of different user and device authentication protocols that follow a similar network architecture, involving a user equipment (UE), a service provider (SP), and an authentication endpoint (AEP). FIG. 1 shows such a general architecture 100. The general architecture 100 comprises a UE 102, a SP 104, and a AEP 106. The UE 102 may communicate with the SP 104, such as a website, to access a service. The SP 104 may require that the UE 102 is authenticated before allowing the UE 102 to access the service. The AEP 106 may authenticate the UE 102 for the SP 104. One example of an architecture that implements the general architecture 100 is a federated identity management architecture, such as the OpenID or OpenID Connect protocols. FIG. 2 shows the general architecture 100 as applied to OpenID. In a system that implements the OpenID protocol, the AEP may be implemented as an OpenID Identity Provider (OP) 202, and the SP is typically referred to as a Relying Party (RP) 204. The OP 202 may authenticate the UE 102 for the RP 204. For example, after the UE 102 is authenticated with the OP 202, the UE 102 may access services provided by the RP 204.

The general architecture 100 of FIG. 1 is also found in systems that implement the Generic Bootstrapping Architecture (GBA). FIG. 3 is an example diagram of a GBA implementation of the general architecture 100. In a GBA implementation, the SP may be implemented as a network access function (NAF) 304, and the AEP may be implemented as a bootstrapping server function (BSF) 302.

There are a variety of different authentication protocols that can be utilized in the architectures shown in FIGS. 1, 2 and 3. For example, in an OpenID architecture, the UE can be authenticated using various protocols such as (AKA, EAP, or GBA). In a system that implements GBA primarily, there are different forms (protocols) of GBA that can be employed. Although there are various forms of authentication available to networks, an entity on a network may be restricted to using certain forms of authentication. For example, some network entities using generic bootstrapping architecture (GBA) may be restricted from negotiating forms of authentication and/or selecting certain forms of authentication. Additionally, network entities may be restricted to authenticating other network entities with certain types of credentials.

SUMMARY

This Summary is provided to introduce various concepts in a simplified form that are further described below in the Detailed Description. This Summary is not intended to identify key features or essential features of the claimed subject matter, nor is it intended to be used to limit the scope of the claimed subject matter.

Disclosed herein are methods and apparatuses for negotiating among the entities of a network to select an authentication protocol and/or credentials to be used to authenticate a user equipment (UE). Embodiments comprising single sign-on (SSO) architectures and Generic Bootstrapping Architectures (GBA) are disclosed.

The embodiments described herein may provide a system comprising a UE, a service provider (SP), and an authentication end point (AEP) which may communicate via a network. A UE may indicate and identify for the AEP one or more authentication protocols and/or credentials that are supported by the UE. The AEP may determine one or more authentication protocols and/or credentials that may be used to authenticate the UE. The UE and the AEP may negotiate to select an authentication protocol and/or credential that is acceptable to the SP. The UE may be authenticated using the selected authentication protocol or credential. In an example embodiment, the AEP may negotiate with the SP to determine one or more authentication protocols or credentials that are acceptable to the SP.

In an example embodiment, a network that negotiates and selects authentication protocols and/or credentials may implement a Generic Bootstrapping Architecture (GBA). For example, the SP in such a network may comprise a Network Access Function (NAF) and the AEP may comprise a Bootstrapping Server Function (BSF). In another example embodiment, the network may implement a GBA and an OpenID federated identity management architecture. For example, the AEP may comprise a NAF and an Identity Provider (IdP) such as, for example, an OpenID IdP (OP). The service provider may comprise a relying party (RP).

DETAILED DESCRIPTION OF ILLUSTRATIVE EMBODIMENTS

Figure 1:
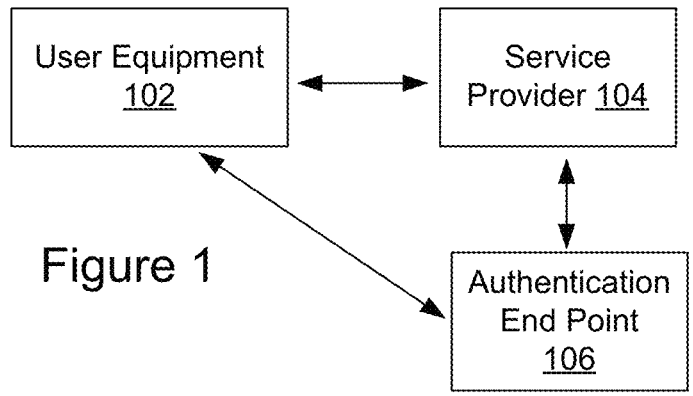
FIG. 1 illustrates an example embodiment of a general architecture utilizing authentication.

Various methods and systems are described herein for negotiating and selecting authentication protocols and/or credentials. For example, systems that implement the general architecture 100 shown in FIG. 1 may negotiate the use of certain authentication protocols and/or select an authentication protocol. Referring to FIG. 1, for example, the user equipment (UE) 102, the service provider (SP) 104, and an authentication end point (AEP) 106 may communicate via a network. The UE 102 may indicate and identify for the AEP 106 one or more authentication protocols and/or credentials that are supported by the UE 102. The AEP 106 may determine one or more authentication protocols and/or credentials that may be used to authenticate the UE 102. The UE 102 and the AEP 106 may negotiate to select an authentication protocol and/or credentials that are acceptable to the SP 104. The UE 102 may be authenticated using the selected authentication protocol and/or credentials. In an example embodiment, the AEP 106 may negotiate with the SP 104 to determine one or more authentication protocols or credentials that are acceptable to the SP 104.

Figure 2:
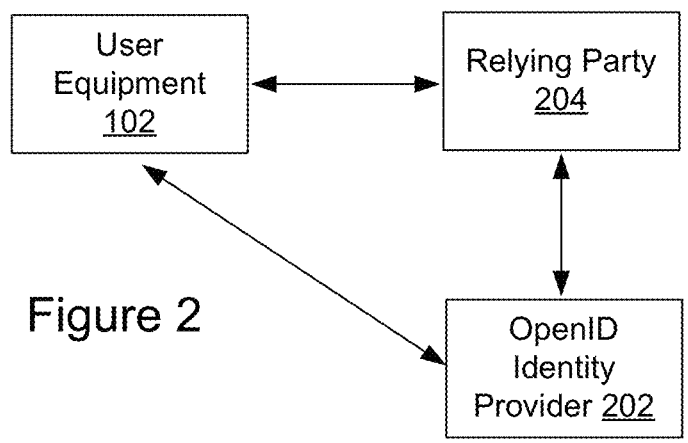
FIG. 2 illustrates an example embodiment of a general architecture implementing an OpenID protocol.

FIG. 2 illustrates an example OpenID architecture in which authentication protocols and/or credentials may be negotiated and selected according to another example embodiment. For example, the UE 102 may send a request to the relying party (RP) 204 for access to a service provided by the RP 204. The UE 102 may negotiate with the OpenID Identity Provider (OP) 202 to select one of a plurality of authentication protocols and/or credentials that are acceptable to the RP 204 and that are supported by the UE 102. The UE 102 may be authenticated using the selected authentication protocol and/or credentials. The OP 202 may send, to the UE 102, an indication of the result of the authentication in accordance with the selected authentication protocol. For example, such an indication may comprise a signed assertion message that may be forwarded to the RP 204 by the UE 102. In an example embodiment, the indication may comprise a key that results from the authentication of the UE in accordance with the selected authentication protocol and/or credentials.

Figure 3:
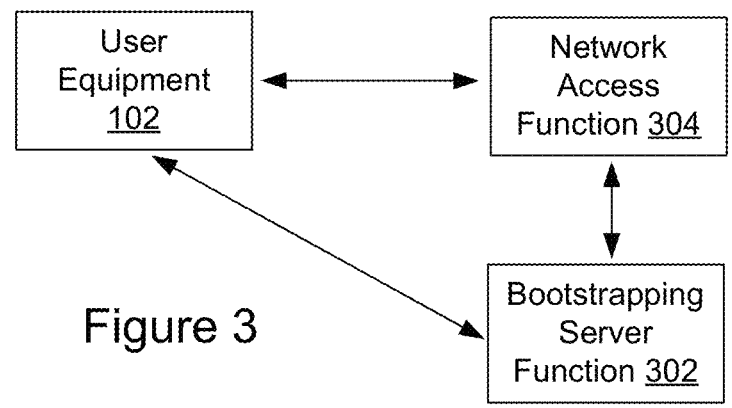
FIG. 3 illustrates an example embodiment of a general architecture implementing a Generic Bootstrapping Architecture (GBA) protocol.

In yet another example embodiment described herein, authentication protocols and/or credentials may be negotiated and selected in a system implementing a Generic Bootstrapping Architecture (GBA), such as shown in FIG. 3. The GBA may refer to a standardized 3GPP architecture as further explained herein. For example, the UE 102 may send a request to the Network Access Function (NAF) 304 for access to a service provided by the NAF 304. For example, a request may comprise a product token in a user agent header. Such a product token may indicate that the UE 102 requests the use of a GBA Digest protocol. In response to such a request, the UE 102 may receive a code 401 response comprising a prefix in a header, wherein the prefix indicates that the UE 102 is allowed to perform the GBA Digest protocol. The UE 102 may negotiate with the Bootstrapping Server Function (BSF) 304 to select one of a plurality of authentication protocols and/or credentials that are acceptable to the NAF 304 and that are supported by the UE 102. For example, the UE 102 may provide an indication to the NAF 304 that one or more GBA authentication protocols are supported by the UE 102. The UE 102 may receive an indication, from the NAF 304, that at least one of the supported GBA authentication protocols are acceptable. Such an acceptable GBA authentication protocol may comprise, for example, a SIP Digest-based GBA security association. As another example, the UE 102 may receive, from the NAF 304, a bootstrapping initiation message comprising a realm attribute. Such a message may trigger the UE 102 to run a bootstrapping protocol using the selected authentication protocol and/or credentials. In one embodiment, if none of the GBA authentication protocols that are supported by the UE 102 are acceptable to the NAF 304, the UE 102 may receive an error message, thereby terminating GBA bootstrapping.

Figure 4:
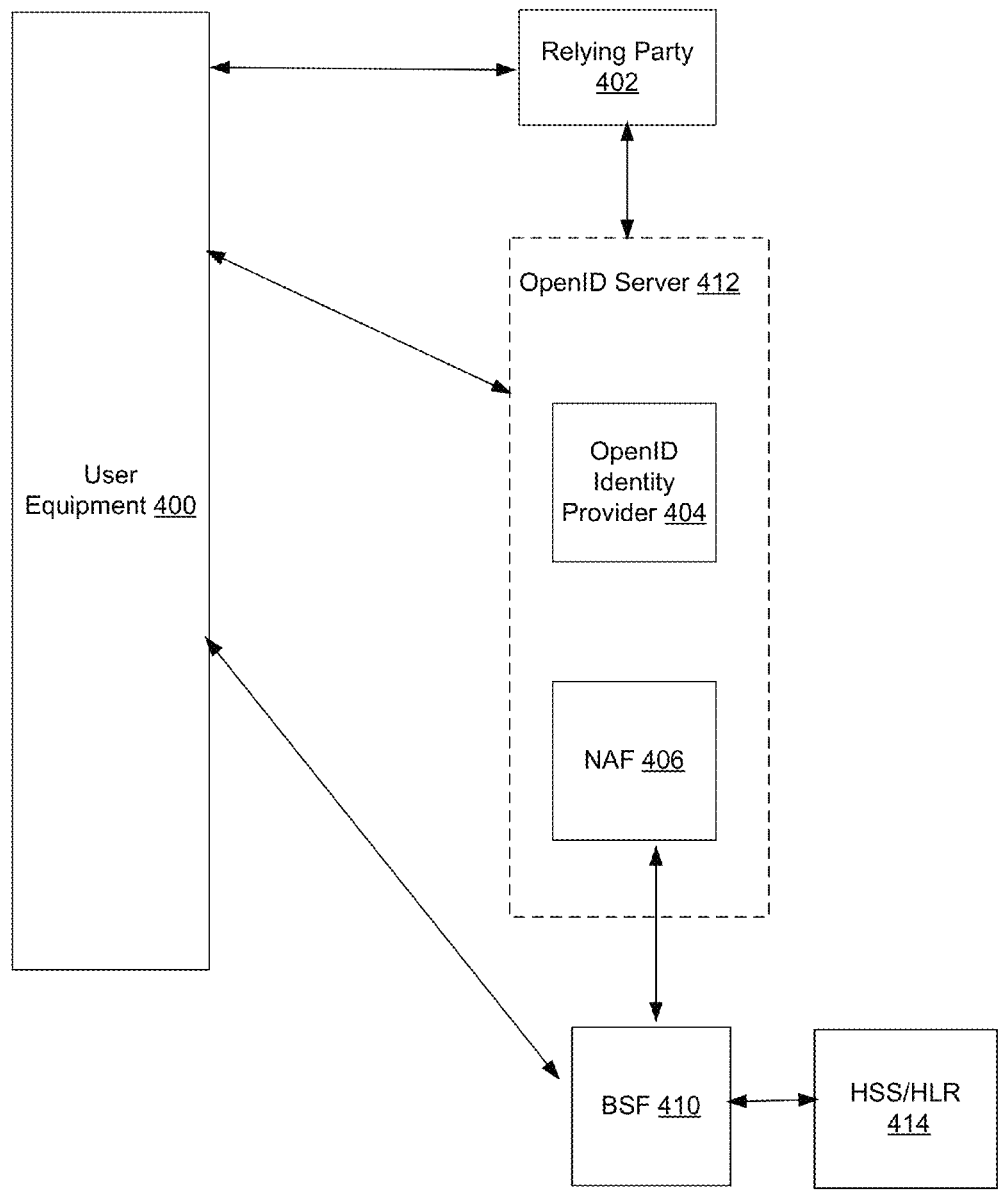
FIG. 4 illustrates an example embodiment of an architecture implementing OpenID and GBA.

In yet another example, in a system that implements the OpenID architecture, the GBA protocol may provide authentication of a user and/or a user equipment (UE). FIG. 4 shows how the OpenID and GBA protocols may cooperate in such a system according to an example embodiment. In such an embodiment, a UE 400 may indicate to the relying party (RP) 402 that it supports GBA-based authentication. As used herein, the term UE may refer to the user device itself or may refer to the user of the UE. The RP 402 may redirect the UE 400 to an OpenID server 412 with integrated network access function (NAF) 406 and OpenID identity provider (OP 404), referred to herein as NAF/OP. The integrated OpenID server 412 (NAF/OP) and the RP 402 may want to 'negotiate' according to the OpenID extensions, for example, to determine whether protocols and/or credentials offered by the RP 402 may be acceptable to the NAF/OP 412. If the negotiated and selected protocol is a GBA protocol, the UE 400 may perform GBA bootstrapping with the BSF 410, for example, according to an operator's policy securely stored on the UE 400 and/or in an operator's policy server (e.g., Home Subscription Server (HSS)/Home Location Register (HLR) 414). In such an embodiment, the integrated OP server 412 of the OpenID protocol may also perform the NAF 406 of the GBA protocol. The AEP in FIG. 4 may comprise the OP 404, the NAF 406, and the BSF 410.

Example Embodiments of Authentication Protocol Selection/Negotiation in an SSO Architecture SSO Framework Description The following provides further details of embodiments of methods for selecting and/or negotiating the use of various authentication protocols in the context of an example SSO framework that embodies the general architecture 100 of FIG. 1. The exemplary SSO framework is shown in greater detail in FIG. 5.

Figure 5:
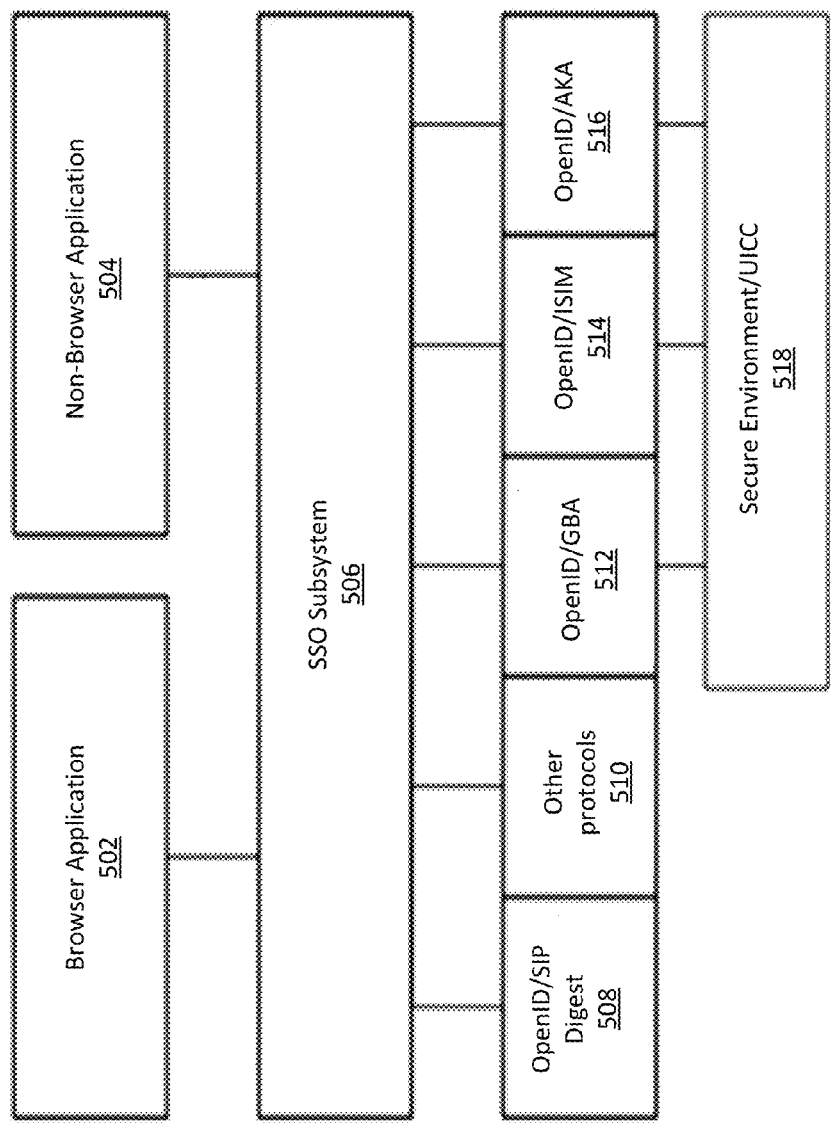
FIG. 5 illustrates an example embodiment of an architectural framework for the use of single sign-on (SSO) with multiple authentication protocols and/or credentials.

As illustrated in FIG. 5, an SSO subsystem 506 may be in communication with an application configured to access services from a service provider (SP), such as browser application 502 and/or non-browser application 504. The applications (browser application 502 and non-browser application 504) may be applications with which the user may interact. Using the browser application 502 and/or non-browser application 504, a user may have access to a variety of services (e.g., websites, banking services, ticket dispensing services for entertainment events, and/or other services provided by a service provider).

The SSO subsystem 506 may serve as the hub for the SSO process. In an example framework, the SSO subsystem 506 may be operator controlled. The SSO subsystem 506 may serve as a network proxy by performing user authentication (e.g., user-assisted and/or network-assisted). Additionally, the SSO subsystem 506 may perform the follow-on creation and/or submittal of signed, or otherwise trustworthy, user identity assertions and/or authentication assertions to service providers and/or identity providers for network-assisted authentication. Some of the functions of the SSO subsystem 506, such as secure storage and processing, may be carried out within the secure trusted environment 518.

The architecture illustrated in FIG. 5 may integrate the user-assisted authentication experience with an array of individual self-contained network-assisted authentication protocols (e.g., also referred to as SSO technologies or SSO protocols or SSO proxies), some of which may use network-assisted authentication to perform a bootstrapping mechanism for authentication and key exchange. For example, the SSO subsystem 506 may be in communication with multiple authentication modules 508, 510, 512, 514, and/or 516, each capable of performing a network-assisted authentication with a service provider using a different network-assisted authentication protocol and/or credential. These network-assisted authentication modules 508, 510, 512, 514, and/or 516 may be used to provide secure user access to a desired service, based on pre-installed credentials such as digital certificates, shared master secrets, or any other method of enrollment with the different supported authentication schemes. For example, the authentication modules may include an OpenID/SIP digest module 508, another OpenID module 510, an OpenID/GBA module 512, an OpenID/ISIM module 514, and/or an OpenID/AKA module 516. While the network-assisted authentication modules illustrated in FIG. 5 each implement an OpenID network-assisted authentication protocol, other types of network-assisted authentication protocols and/or credentials may also, or alternatively, be implemented.

One or more of the network-assisted authentication modules may be supported by a given service provider and/or identity provider. Each network-assisted authentication module may be configured to perform a network-assisted authentication by implementing its corresponding authentication protocol, such as by using an authentication algorithm for example. The OpenID/GBA module 512, OpenID/ISIM module 514, and/or OpenID/AKA module 516 may be in communication with a secure trusted environment 518. The secure trusted environment 518 may include a UICC, a smart card, or other secure trusted environment for example. In an example embodiment, the secure trusted environment 518 may be a hardware-based entity on a UE, and may be responsible for securely storing sensitive data (e.g., cryptographic keys, subscriber credentials) and executing secure processing of sensitive functions (e.g., cryptographic calculations).

One or more of the components illustrated in FIG. 5 may reside in a mobile communications device. While FIG. 5 illustrates functional modules within the described architecture, FIG. 5 is not meant to require the residence of any non-application function as being either on or off the secure trusted environment 518. The components and their interactions are described in greater detail herein. Although authentication may be described with reference to the OpenID protocol, the same concepts may be applied to other authentication protocols, such as Liberty Alliance for example.

The user may use an application (e.g., browser application 502 and/or non-browser application 504) to make an initial visit to a service provider (e.g., relying party (RP)), such as a network application service provider for example. The service provider (e.g., RP) may receive a user identification which, for example, could be an OpenID user identifier. In the case of OpenID the user may be redirected (e.g., the discovery mechanism may use the OpenID Provider (OP) identity to determine the internet address of the OP), following an RP initiated discovery, to the network based Identity Management entity, which may be the OP for example. The OP identity may be used to provide the internet address of the OP to the RP. The authentication process may then begin.

The SSO subsystem 506 may provide a user authentication interface for enabling communications with the applications with which the user interacts on the application side and a network authentication interface for the network-assisted authentication modules 508, 510, 512, 514, and/or 516. Thus, different applications (e.g., browser application 502 and/or non-browser application 504) may provide inputs to the SSO subsystem 506 based on user inputs or the SSO subsystem 506 may present an authentication screen to the user to enable network-assisted authentication of the user with a service provider and/or local user-assisted authentication with the UE. The different network-assisted authentication modules 508, 510, 512, 514, and/or 516 (e.g., authentication protocols) may be designed to interact with the SSO subsystem 506. Policy management may also be performed by the SSO subsystem 506.

The SSO subsystem 506 authentication structure may possess two types of user authentication, user-assisted authentication and network-assisted authentication. Both of these types may be separated so that one could occur independently of the other but the two may be bound to each other (e.g., via assertions that may be produced by the SSO subsystem) and interact with each other (e.g., a user-assisted authentication may trigger a network-assisted authentication or visa-versa). The user-assisted authentication of the user and the provisioning of credentials from the user to the SSO subsystem 506 (for the user-assisted authentication) may occur independently and may be decoupled from the network-assisted authentication protocol. The user may be shielded from the network-assisted authentication protocol. This transparency, along with the fact that a single set of user credentials may be independent of the service provider, may result in a seamless SSO experience for the user. Moreover, the two authentication types may provide for a binding of the user claimed identity through its credential, be it biometric, a password, a PIN, a token, another user credential, or a combination thereof, with the subscriber credentials held in the UICC or device identity, such as IMSI or IMPI. Such binding, along with the architectural decoupling of both types of authentication, may be achieved by the SSO subsystem 506 serving as an intermediary layer. The SSO subsystem may perform a cryptographic binding, either by itself or by a call to one of the lower-layer authentication protocols as described herein.

The SSO subsystem 506 may function as a proxy for the network-assisted authentication functions of an external stakeholder, such as an MNO for example, and may provide information concerning provisioned policy functions to the external stakeholder. When a user initiates access to a service (e.g., through keying a URL on a web browser or starting an application), a user-assisted authentication process may be initiated. For example, the user may be requested to input a user credential, such as a biometric credential, and/or a password such as a PIN, for example. In an example framework, a mobile communications device may possess PIN features for access to the device itself which may also be part of the user credential information. For example, the user interface of the UE may convey user-assisted authentication credential information, the service being accessed (e.g., in the form of the web URL or the application activated), and/or other information related to the service to be used, to the SSO subsystem 506 through a specific interface. Such a conveyance may activate functions within the SSO subsystem 506 to authenticate the user, based on the provided information and provisioned policies. For example, parameters from the user-assisted authentication may be supplied to the network-assisted authentication protocol. Such parameters may include, for example, the confidence level of the user-assisted authentication, the result (e.g., pass or fail) of the user-assisted authentication, and the time of the user-assigned authentication. The SSO subsystem 506 may run a policy function which may comprise various authentication related parameters such as, for example, the confidence (assurance) level of authentication considered to be adequate for the service being accessed and the minimum freshness (e.g., time completed) of the authentication. For example, the user may wish to use a banking service for the purpose of paying a bill. In this scenario, the provisioned policy may require a strong form of user-assisted authentication (e.g., multi-factor) and the provisioned policy may require that the authentication be carried out just prior to navigating the user to the service. If a low level of security is desired for a service (e.g., email access) the policies may relax the user-assisted authentication requirements. For example, a PIN may be used for user-assisted authentication with a low level of security. The policies that drive the user authentication may be performed by the external stakeholder and/or the service provider. For example, a policy function may be performed at the service provider (e.g., on the network), at the UE (e.g., locally), or a combination thereof (e.g., distributed functions).

In an example SSO framework, the policies to be followed by the SSO subsystem 506 may determine what SSO authentication protocol (e.g., network-assisted authentication module 508, 510, 512, 514, and/or 516) is to be selected for a network-assisted authentication. The criteria for network-assisted authentication module (e.g., SSO authentication protocol) selection may be based on available resources and/or the security requirements of the service to be accessed. The internal policy mechanisms may include an external stakeholder (e.g., MNO) provided prioritized list of preferred authentication modules (e.g., SSO authentication protocols). Once the policy decision is made, the SSO subsystem 506 may provide a mechanism for communicating to the external stakeholder (e.g., MNO) which specific network-assisted authentication module has been selected for the protocol exchanges. Alternatively, as descried herein with reference to FIGS. 7 and 8, for example, the SSO subsystem may negotiate capabilities and agree on an authentication protocol to be used.

Figure 6A:
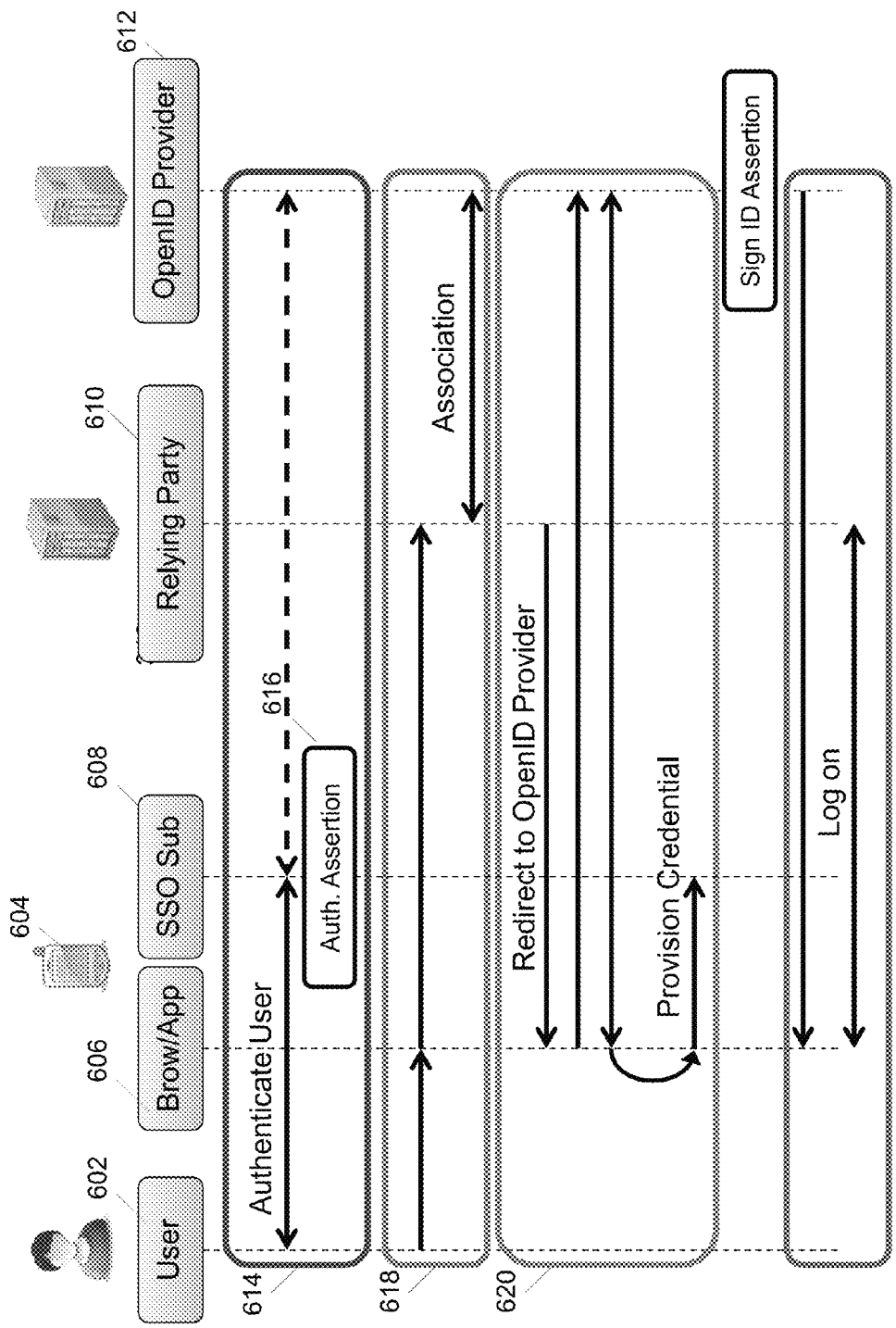
FIGS. 6A and 6B illustrates an example embodiment of protocol flows for an SSO framework architecture.
Figure 6B:
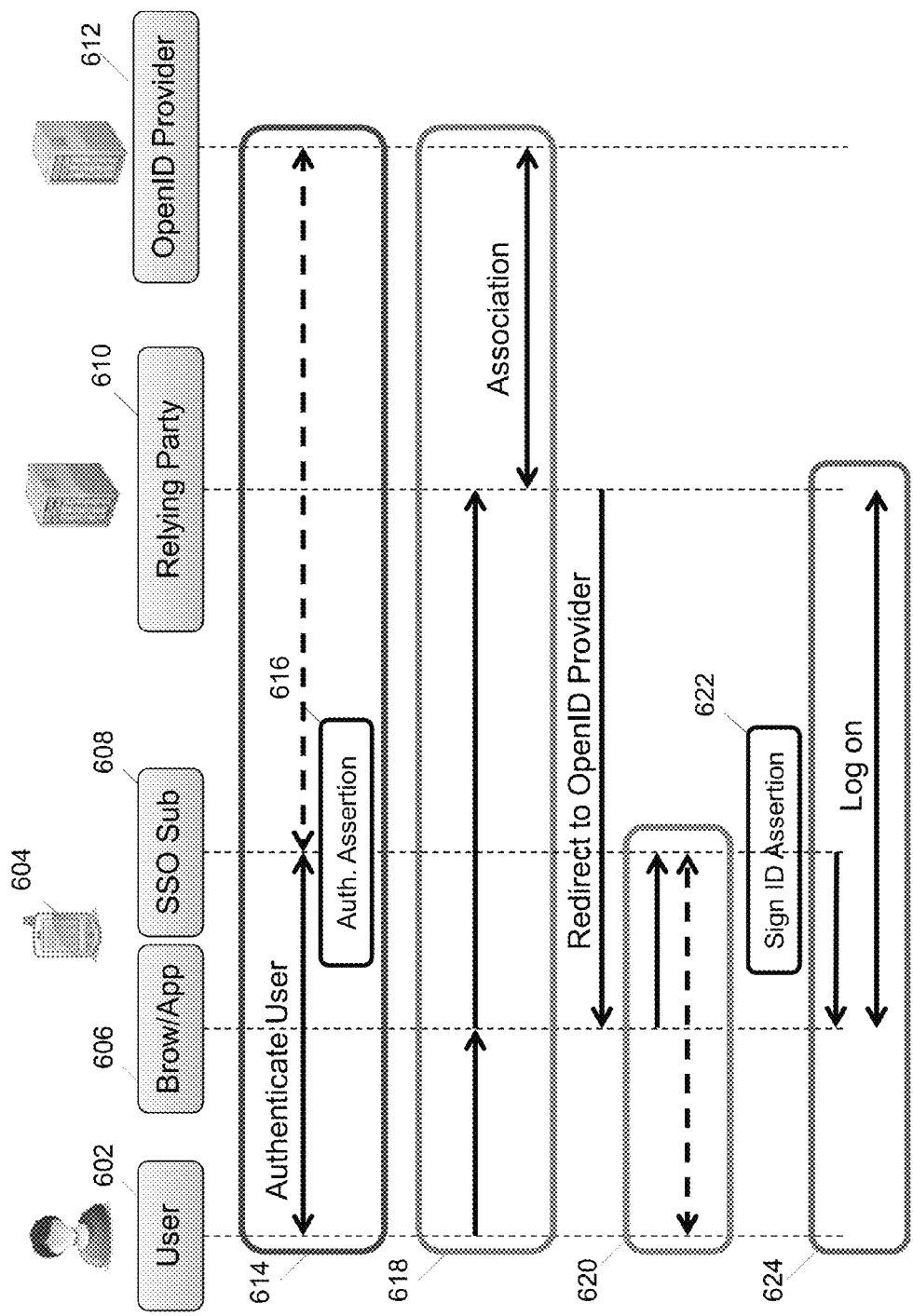

FIGS. 6A and 6B illustrate example embodiments of a protocol implemented using an SSO framework architecture, such as the general architecture 100 shown in FIG. 1. In the context of OpenID, the SSO subsystem may perform certain functions in a secure manner, some of which are described herein with reference to the call flow in FIGS. 6A and 6B.

As illustrated in FIGS. 6A and 6B, at 614, a user-assisted authentication may be performed. For example, user credentials may be authenticated and/or processed. The user credentials may include unique authentication parameters associated with the user 602, such as a user PIN, a password, a user identifier, biometric information, or digest, and/or other forms of user-assisted authentication parameters. The user 602 may be authenticated locally, at the device 604, or in combination with a remote entity, such as an external stakeholder (e.g., MNO) or an Identity provider (IdP) (e.g., OpenID Provider 612).

The SSO subsystem 608 may be the local entity on the user device 604 configured to perform authentication of the user 602. The SSO subsystem 608 may perform authentication with or without a local assertion entity (LAE) according to various frameworks. For example, FIG. 6A illustrates an example provisioning protocol flow that may enable the SSO subsystem to perform authentication locally, as described herein. Once the user-assisted authentication is complete, the SSO subsystem 608 may generate an authentication result, such as an authentication assertion for example, at 616. An authentication assertion may comprise data such as, for example, a time that the user-assisted authentication was completed and a confidence level of authentication. The level of confidence may refer to a level of assurance to which a remote party may place in the authentication of a user or UE. The user-assisted authentication result (e.g., pass or fail) may be stored securely and locally at the device 604 and/or used with the network-assisted authentication protocol. Other parameters associated with the user-assisted authentication may also be stored and/or used in the network-assisted authentication. For example, these parameters may include a time of authentication, strength of authentication, and/or type of authentication parameter(s). These parameters may be stored with the authentication result or used in the network-assisted authentication. For example, the SSO subsystem may use the information to relay authentication data to a service provider, and the service provider may determine whether the authentication data is sufficient to provide a user access to a service. The user-assisted authentication at 614 may occur at any time and as frequently or infrequently as suggested based upon various authentication policies, such as desired security strength for example. In an example embodiment, if a valid user-assisted authentication result is stored, the SSO subsystem may determine that the user-level authentication need not be performed. Such a scenario may allow the user to access multiple service providers (e.g., RPs) without further user involvement in the authentication process. If a policy requires fresh authentication for access to a specific service at a specific service provider, for example, such re-use of existing authentication information may not be allowed.

At 618, a shared secret key may be established between the RP 610 and the OP 612. For example, the user's OP log-on request, which may include a user-supplied identifier, may be passed to the RP 610 from the application 606 (e.g., browser or non-browser application), which may trigger an association and/or establishment of the shared secret key. For example, the log-on request may be passed to the RP 610 when the user initially attempts to access a network-based service. Based on the received log-on request, an association may be performed that may establish a shared secret key between the OP 612 and the RP 610. In an example SSO framework, at 620, a key (e.g., a key derived from the OP 612 and RP 610 shared key and/or a key derived during network-assisted authentication) and/or other credentials may be provisioned to the SSO subsystem 608. The provisioned credentials may be used in further authentication with services as described herein.

For example, network-assisted authentication may be performed after provisioning, as illustrated in FIG. 6B. For example, the network-assisted authentication may follow a redirection to the OP 612 by the RP 610. The redirect may be received by the application 606 (e.g., browser application or non-browser application), which may redirect the message to the SSO subsystem 608, at 621, for selection of the network-assisted authentication module and/or protocol. The network-assisted authentication module/protocol (e.g., SSO protocol) may be selected and used by the SSO subsystem 608 via policy implementation. This process may include bootstrapping and shared key establishment as further described herein.

As shown in FIG. 5, several network-assisted authentication protocol methodologies may be implied by the suite of network-assisted authentication modules (e.g., SSO protocols). Referring again to FIG. 6B, according to an example embodiment, OpenID/SIP Digest and/or OpenID/GBA may be viewed as possessing the GBA structure and employ the mechanisms specified in 3rd Generation Partnership Project (3GPP) Technical Specification (TS) number 33.220 (release 10). In OpenID GBA, UICC subscriber credentials may be used to bootstrap a master session key (e.g., denoted Ks) to be shared with the network. The network-assisted authentication may result in an application specific key, Ks_NAF, derived from Ks and shared between the OP 612 and user device 604. The application specific key may be used as a password by the user device 604 when authenticating with the OP 612. For example, it may be used as a password by the user device 604, as described in 3GPP Technical Report (TR) number 33.924 (release 9) for example.

For OpenID/SIP Digest a similar key structure may result through a similar GBA process. This approach to network-assisted authentication may be non-UICC based and SIP Digest credentials may be used, rather than UICC credentials for example. One example embodiment of OpenID/SIP Digest is described in 3GPP TR 33.914 (release 11).

For OpenID/AKA, the network-assisted authentication may be non-GBA based and the user device 604 and OP 612 may employ the 3GPP AKA directly to authenticate and share a key. One example embodiment of OpenID/AKA is described in Alcatel-Lucent pCR 53-100757 in 3GPP SA3.

For conventional OpenID, the SSO subsystem 608 may supply the received user credentials in the network-assisted authentication protocol.

Although OpenID/GBA, OpenID/SIP Digest, and OpenID/AKA may have structural dissimilarities, the application of authentication vectors (AVs), of one type or another, received from the network Home Subscription Server (HSS), may be central to the respective protocols. FIG. 4 illustrates an example of how the HSS may fit into an overall architecture. Additionally, depending upon the policies and the desired security strength, re-authentication of the user (user-assisted authentication) may be carried out when the network-assisted authentication is performed. In an example embodiment, during such a network-assisted authentication it may be assumed that the device has established a network connection, and the network-assisted authentication may be used to authenticate the UE with a service provider.

After successful network-assisted authentication, the SSO subsystem 608 may provide an indication to the application 606 that the network-assisted authentication was successful. For example, the SSO subsystem (e.g., via a LAE) may sign an authentication assertion (e.g., an identity assertion) at 622 and send an assertion message at 624 to the RP 610. The signed assertion message from the SSO subsystem 608 to the RP 610 may indicate successful authentication and may be signed autonomously by the SSO subsystem 608 with the previously provisioned credential (e.g., shown at 620 in FIG. 6A). This notification of successful network-assisted authentication may be performed before the user 602 gains access to the desired service at the RP 610. Early in the authentication process (e.g., SSO process) an association may have been performed establishing a shared secret key between the OP 612 and the RP 610. The assertion message may be signed with this shared secret key and/or a derivation of the key. Once the RP 610 and/or the user device 604 (e.g., via application 606) have received an indication that the network-assisted authentication was successful, the user device 604 (e.g., via application 606) may access the services at the RP 610 to which it is logged on.

The assertion message provided to the RP 610 may indicate that both authentication to the network and to the service may be complete and that the user claimed identity implemented in the user-assisted authentication may be bound to the subscriber credentials, such as the IMSI or IMPI for example, implemented in the network-assisted authentication. For example, it may be part of the selected SSO functionality that the binding be performed via a mechanism that sees the connection between user-supplied credentials and UICC-based (or SIP Digest) credentials. The assertion message may comprise information indicative of binding as part of the overall SSO protocol. Also, in an example SSO framework, the assertion message may provide an authentication strength or confidence level (e.g., low, medium, high, very high). For example, a low authentication strength in the assertion message may indicate that the OP 612 has little or no confidence in the asserted identity (e.g., automatic insertion of username/password with minimal rules for format of password); a medium authentication strength may indicate that the OP 612 has some confidence in the asserted identity (e.g., manual use of username/password with rules applied to format of password); a high authentication strength in the assertion message may indicate that the OP 612 has a high level of confidence in the asserted identity (e.g., use of biometric or crypto network-access token and username/password); and a very high authentication strength may indicate that the OP 612 has a very high level of confidence in the asserted identity (e.g., biometric and crypto token). In an example embodiment, "low" and "medium" levels may indicate that only user credentials are used, and a "high" and "very high" level may require network-assisted interactions to take place and may require a stronger form of authentication such as a biometric and password.

Referring again to FIG. 5, FIG. 5 illustrates exemplary SSO technologies (authentication protocols) that may be available for network controlled bootstrapping and key establishment. For example, the OpenID/ISIM 514 and OpenID/AKA 516 may be UICC-based and may make use of credentials, such as shared secrets with the network, which may reside securely on the UICC. OpenID/GBA 212 may or may not be UICC based, for example, depending on credentials shared with the network. In an example framework, OpenID/SIP Digest 508 may not be UICC based. For example, a conventional user supplied OpenID identity and password may be accommodated. The network authentication interface of the SSO subsystem may allow various SSO authentication protocols (e.g., modules 508, 510, 512, 514, 516 in FIG. 5) to be accommodated within a single architectural framework.

In an example SSO framework, a user may be verified with two authentication type binding. Although the user verification may be described with reference to the OpenID protocol, the same concepts may be applied to other authentication protocols, such as Liberty Alliance for example. Upon powering a UE, for example, a user-assisted authentication may occur. For example, a user may provide a user-assisted authentication credential (e.g., a PIN, biometrics) to gain access to the device functions. For example, a user may provide a PIN to gain access to an iPhone. Such authentication mechanisms may be provided one-time at power up or intermittently throughout a session. The frequency requirements for authenticating a user may be policy driven. The SSO subsystem may verify the user provided PIN and may save the result, which may be in the form of an assertion, confirming that the PIN has been entered and verified. Such an assertion may establish user-assisted authentication. After user-assisted authentication is established, the user may attempt a login of a service provider (e.g., RP) which, for example, may support an OpenID protocol by directing a web browser to the RP web page. The SSO subsystem may check the status of user-assisted authentication, and if the status is valid, may supply the user identity to the RP. The RP may perform a discovery of the OpenID provider (OP) and the two entities may establish an association. Such an association may result in a shared key. The device may be redirected to the LAE, which may be an on-UE local OpenID proxy function that may be carried out by the SSO subsystem. In an example embodiment, the policy (e.g., of an external stakeholder) carried out by the SSO may require that a strong network-assisted authentication (e.g., GBA, EAP, AKA) be performed. An authentication module (e.g., an SSO authentication protocol and/or credential) may be selected. Such a selection may be reported to the MNO, for example, by the SSO subsystem in the authentication protocol. The authentication of the UE may be performed using the selected network-assisted authentication module (e.g., SSO authentication protocol). In an example embodiment, the selected authentication protocol may result in a bootstrap of a shared application specific key between a network-assisted authentication function and the UE. Such a key may be used to authenticate the UE.

The UE may receive an indication of authentication completion and the LAE may sign an assertion message to the RP, indicating that a strong authentication has taken place. The assertion may indicate a binding between the user-assisted authentication (e.g., via the initial user PIN entry) and the subsequent network-assisted authentication (e.g., via the selected SSO authentication protocol). The assertion may indicate one of the authentication confidence levels defined herein. The assertion message may be signed using the key established through association between the local SSO Proxy (e.g., LAE) and the RP. The RP and the LAE may not communicate directly, and so an OP service function (OPSF) may be created on the network to facilitate communication between the two entities. The OPSF may be reachable via the public internet by the RP which may communicate with this function as though it is the OP. The local SSO (LAE) proxy may obtain the association key through the OPSF key distribution mechanism. The OPSF may also support signature verification for the RP with respect to the signed assertion originating from the LAE. The user may then be directed to the RP web page seamlessly. In an example framework, when the user later wishes to access a different service provider, the SSO subsystem may check if a user-assisted authentication result is already stored and if that authentication is still valid (e.g., according to locally stored policy). If there is a valid stored result, for example, the SSO subsystem may not perform user-assisted authentication at this time. The new service provider may then perform a discovery of the identity provider as described herein. Thus, the user may access the new service provider without entering credentials at the UE and the user may not be involved with the network-assisted authentication. Such a scenario may constitute a full SSO implementation according to an embodiment.

In an example framework, users may access preferred (e.g., affiliated) services through registration of preferred services and/or applications. For example, a web or other online applications service provider (e.g., a relying party) may register to an operator's network-based SSO System using an IdP of the service provider's choice. For example, a payment transaction provider may use OpenID to obtain delegated authentication from a particular IdP, which may result in the payment transaction provider becoming an affiliated service. The registration may be initiated by the service provider (e.g., RP), the chosen IdP, the operator's SSO system, or the end user of the service. Further, the registration may be initiated by a user accessing a web-page or the UE-resident SSO subsystem. For example, an SSO subsystem residing on the UE may become 'synchronized' to the database of the network-based SSO subsystem, and thereby may become aware of the list and type of the registered, affiliated services and applications.

The RP may be allowed to select the IdP while not explicitly selecting the SSO authentication protocol and/or credential. For example, there may be an implicit association between the selection of the IdP and the SSO authentication protocol to be used. For example, the RP may choose a specific IdP because the IdP may support a specific SSO authentication protocol, such as OpenID.

The user may then access a SSO (e.g., OpenID) supported Web-based application service by using the UE. The UE-resident SSO subsystem may comply with an operator provisioned policy and may select a registered affiliated service/application and/or a preferred service/application. The UE-resident SSO subsystem may also intercept (intervene), for example, after the user indicates (e.g., via typing in a URL) his or her preferred service, and may convert or replace the user-typed URL with the URL of an alternative service corresponding to the registered, affiliated version of the same service. Such a replacement service may be provided by the same provider but may be presented and accessed by a preferential, affiliated basis. For example, access may be limited to users of UEs serviced by an operator who has the aforementioned registration-based affiliation to the aforementioned services/applications (e.g., and IdPs and RPs who may provide such services/applications).

According to an example SSO framework, subsequent to selection of the service/application, the UE may select a preferred access network-assisted authentication mechanism and/or the appropriate credentials, on behalf of the user, in a transparent and/or seamless manner. For example, the UE may indicate the selected access network-assisted authentication mechanism within the SSO authentication protocol. The network may recognize the selected preferred access network-assisted authentication mechanism and may authenticate the user. Upon successful authentication, the rest of the SSO operation (e.g., UE redirection to the RP to obtain service) may take place.

As described herein, by connecting to the operator's trust infrastructure by way of the operator's SSO System, the subscribed, affiliated service may effectively acquire network-assisted authentication strength afforded by the operator.

More generally, the SSO architecture described herein may be viewed as incorporating a more formalized functional hierarchy. For example, the SSO subsystem may manage one or more SSO clients (e.g., or local SSO proxies). If the underlying device technology supports a multi-service provider configuration, then a multitude of SSO clients may run as sub-functions to a multi-service manager within the SSO subsystem. This generalized architecture may provide for the separation used to support multiple services with potentially independent policies.

Each SSO client within such a framework may manage several subordinate sub-functions. For example, the local assertion sub-function may be performed by a Local Assertion Entity (LAE). LAE may refer to a formal designation of the sub-function which performs local assertion. One or more LAEs may be controlled by an SSO client, for example, depending on the implementation. For example, the configuration may involve SSO client-LAE pairs (one-to-one) or one client controlling multiple LAEs. In either configuration the SSO client may be the controlling entity. The SSO authentication protocol may also be referred to as the SSO technology herein. For example, the SSO client may control the processing of the mechanisms carried out by the selected SSO authentication protocol. The SSO client may manage the policy enforcement actions that may determine which authentication method may be used. For example, the policies applied may be under the control of an external stakeholder such as the MNO.

According to another example framework, UEs may support the implementation of multiple SSO clients running as sub-functions within a multi-service manager. Such an implementation may be viewed as functioning in an environment where different service providers may need a separate, isolated SSO client exclusively serving that particular provider while allowing policy-based management of the multiple available connection technologies and services provided by the same provider concurrently. For example, the ME may have SSO Client A and SSO Client B, and each of these SSO Clients may be controlled separately and in isolation from each other. The SSO aspects may be specific to the provider.

Along with the multiple SSO clients, there may be a multitude of LAEs. For example, each LAE may be implemented in an access-technology-specific domain on the UE. Because of the SSO client isolation, there may be one LAE per isolated domain. Also, for example, the LAE may be structured according to the available access technologies supported by the device. The same access technology may be multiplexed between the different LAEs or different access technologies may be used by the LAEs concurrently. Thus the UE may support multiple LAEs. Depending on the implementation, for example, the relationship between LAEs and SSO clients may be one-to-one or one SSO client may control or be served by multiple LAEs.

As described herein, the functions performed within the SSO subsystem may be configured in a variety of ways. In the UE, for example, there may be division between UICC and non-UICC (or alternatively secure environment) based architectures. There may also be the demarcation of functions between the UE and the MNO network. The following are some possible configurations according to various embodiments.

Cryptographic AKA functions may reside on a non-UICC smartcard. Such functions may be performed on a fully-programmable, non-UICC smartcard such as G&D's MSC and may be similar to network-assisted authentication (e.g., AKA), but the card may be removable and under user control. Cryptographic functions may reside on a UICC. Such functions may include elementary crypto functions of a LAE implemented on a UICC, such as, for example, key derivation and assertion signing. The functionality may be similar to network-assisted authentication (AKA). Additionally, binding to IMSI and user registration with a MNO may be realized.

According to an example SSO framework, LAE functions may reside on a UICC or secure trusted environment. For example, an LAE may be a full implementation of OpenID on a smartcard web server (SCWS) or other web browser application. In an example embodiment, a network-assisted authentication configuration may be to bind LAE (e.g., local assertion) authentication to any form of strong network-assisted authentication (e.g., local OpenID/GBA). Strong authentication may apply to strong local user-assisted authentication as an additional factor by adding biometrics or similar local authentication. For example, any form of strong local authentication may be combined with and bound to network-assisted authentication.

Selection/Negotiation in an SSO Framework

Having thus described the exemplary SSO framework, embodiments of methods and systems for selection and negotiation of various authentication protocols in such an exemplary SSO framework will now be described.

Figure 7:
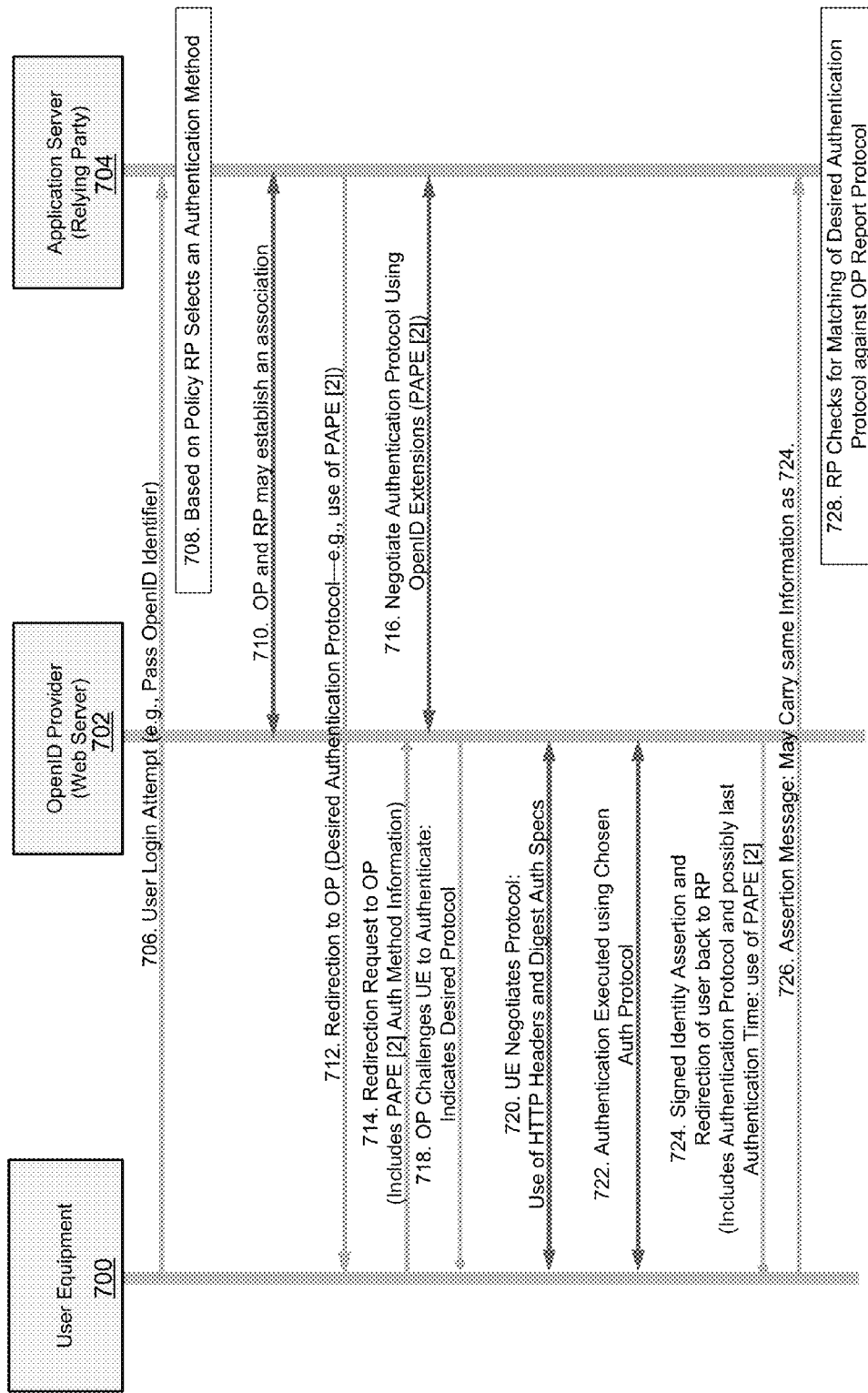
FIG. 7 illustrates an example embodiment of a protocol flow for negotiation and selection of user authentication protocols and/or credentials.
Figure 8:
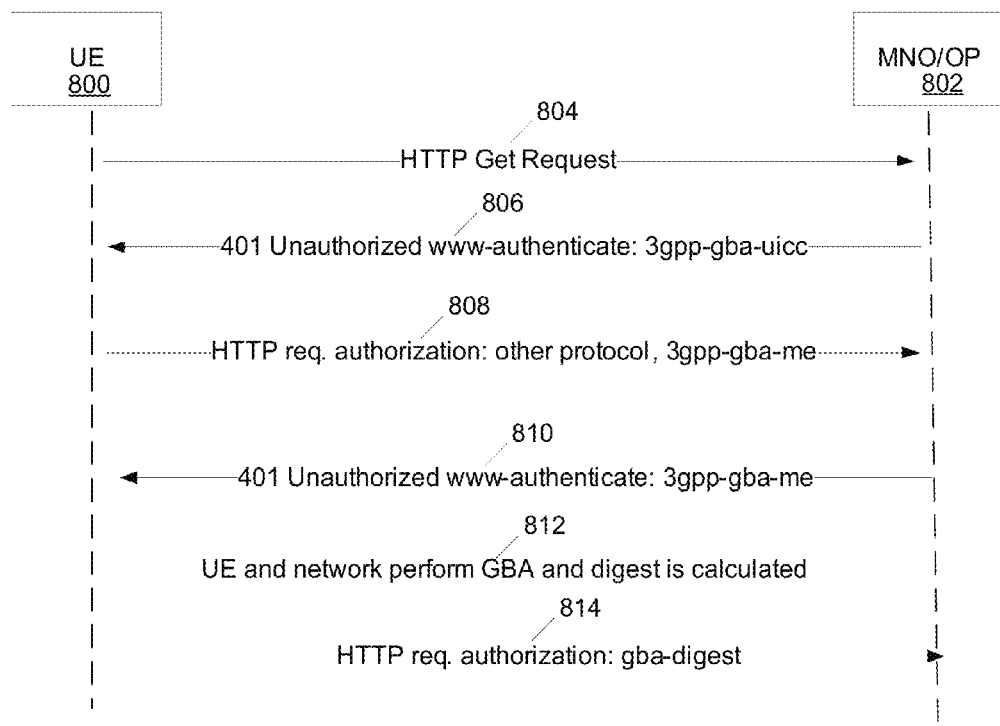
FIG. 8 shows an example message exchange for negotiations between a UE and a mobile network operator (MNO) controlled OpenID identity provider (OP)

FIGS. 7 and 8 illustrate example negotiations and selections that may be implemented by the SSO framework shown in FIG. 5. For example, a specific authentication protocol or specific credential may be negotiated and selected when a UE belonging to a user communicates with a single-sign on (SSO) identity provider (IdP). An example embodiment uses the OpenID 2.0 protocol, available at http://openid.net/specs/openid-authentication-2_0.html. For example, negotiation and selection may utilize standardized protocols and/or tools such as OpenID Provider Authorization Policy Extension (PAPE) and HTTP based authentication. PAPE is described in OpenID Provider Authentication Policy Exchange (PAPE), available at http://openid.net/specs/openid-provider-authentication-policy-extension-1_0-01.html. HTTP based authentication is described in IETF RFC 2616—Hypertext Transfer Protocol HTTP/1.1, available at http://www.ietf.org/rfc/rfc2616.txt, IETF RFC 2617—HTTP Authentication: Basic and Digest Access Authentication, available at http://www.ietf.org/rfc/rfc2617.txt, and IETF RFC 3310—Hypertext Transfer Protocol (HTTP) Digest Authentication Using Authentication and Key Agreement (AKA), available at http://www.ietf.org/rfc/rfc3310.txt. Additional mechanisms may be used when the IdP is controlled by a Mobile Network Operator (MNO), for example, to ultimately gain access to a web service provider such as an RP.

The use of OpenID extensions, such as the PAPE extension, may include present, past and future versions of the OpenID protocol. Although the example embodiments described herein are focused on an OpenID based authentication flow, embodiments are not so limited and any form of SSO or IdP schema may be used, such as Liberty Alliance, OAuth, and the like.

HTTP based authentication may be used in various embodiments. In an example embodiment, UE authentication may be implemented without local entities, such as local OPs or local SSO subsystem. In an alternative embodiment, the function of the SSO IdP may be divided between a network-based server(s) and a local entity residing on or attached to the UE.

In an example embodiment, an IdP may supervise and/or facilitate automated selection of SSO user authentication protocols and/or credentials for a user using a device (UE) that may subscribe to a cellular/wireless network access service from the MNO, on behalf of a web service provider such as a relying party (RP). For example, the IdP may be controlled by a mobile network operator (MNO) (e.g., MNO/IdP). In an example embodiment, authentication may be carried out via the OpenID protocol. In such an embodiment, the IdP may comprise an OpenID Provider (OP), and an MNO-controlled IdP may comprise an OP controlled by a MNO (MNO/OP). In an example embodiment, the OP may receive the requirements and/or preferences of the RP in terms of user authentication (e.g., via a PAPE message). In another example embodiment, the OP may recognize a specific RP and obtain requirements and/or preferences of the RP from a database. Such requirements and/or preferences of the RP may relate to required and/or preferred user authentication protocols, characteristics, and/or credentials. In such an embodiment, the OP may recognize a specific RP and obtain requirements and/or preferences of the RP without exchanging explicit messages for such information with the RP.

As described herein, a service provider (e.g., RP) and an authentication end point (AEP) such as, for example, an OP, may conduct fine-grained negotiations to select an authentication protocol and/or credentials for authenticating a user and/or a UE. The RP and the OP may negotiate and/or provide indications of required or preferred authentication protocols (or characteristics of authentication protocols) in the scope of OpenID as an extension to high-level policies. In an example embodiment, the OP may use its own policy to pre-select and/or determine which authentication protocol to request from a UE. In yet another example embodiment, the UE may use a policy configured by a MNO/OP, to select and/or determine which authentication protocol to use and may respond accordingly to the MNO/OP. For example, an OP may send multiple messages requesting authentication in a pre-configured time frame and the UE may select an authentication protocol based on stored policies. Policies may be based on a criterion or various criteria (e.g., most preferred by the OP, most secure, least OTA traffic, least battery-consuming, and the like). In an example embodiment, the OP and/or service provider (e.g., RP) may define their own policies and may indicate (signal) their fine-grained authentication protocol selection preferences.

FIG. 7 illustrates an example embodiment of a protocol flow for negotiation and selection of user authentication protocols and/or credentials. FIG. 7 illustrates OpenID SSO, although embodiments are not so limited. For example, the OpenID Provider (OP) 702 (e.g., web server) may be referred to as an authentication end point (AEP) and may be implemented by other identity providers, and the RP 704 (e.g., application server) may be implemented by other service providers consistent with various protocols.

Referring to FIG. 7, the user (e.g., UE 700) may attempt to login to the RP 704 at 706. For example, the user may visit the RP 704 and may provide his OpenID identifier to the RP 704. At 708, the RP 704 may select an authentication protocol, for example, based on policy and/or based on a service for which the user requests access. For example, the RP 704 may determine (e.g., based on the provided OpenID identifier) one or more user authentication protocols and/or credentials that the RP may require and/or prefer. In an example embodiment, the RP 704 may determine general characteristics that the RP 704 may require and/or prefer. One or more authentication protocols and/or credentials may comprise such characteristics. At 710, the RP 704 may initiate the OpenID protocol and the OP 702 and the RP 704 may establish an association. At 712, the RP may redirect the UE 700 to the OP 702. At 712, the RP 704 may send a request, to the UE 700, for the desired authentication protocol and/or credential via extensions such as PAPE, for example. At 714, the UE 700 may send the redirection request to the OP 702, which may comprise the desired authentication protocol and/or credential via extensions such as PAPE. At 716, the RP 704 and the OP 702 may negotiate whether the desired authentication protocol and/or credentials may be implemented. For example, the OP 702 and the RP 704 may jointly determine whether the desired protocol may be fulfilled according to OpenID extensions such as PAPE. For example, the OP 702 may promote which protocols are supported, the RP may then require one of the supported protocols. At 718, the OP 702 may engage in OpenID with the UE/user 700.

For example, at 718, the OP 702 may challenge the UE 700 to authenticate, and the challenge may comprise an indication of the desired authentication protocol and/or credentials. At 720, the UE 700 and the OP 702 may negotiate an authentication protocol and/or credentials (e.g., via HTTP headers). For example, the OP 702 and/or the UE 700 may determine whether the UE supports the desired authentication protocol. In an example embodiment, the OP 702 might know which authentication protocols and/or credentials the UE 700 supports. The UE 700 may also inform the OP 702 which authentication protocols and/or credentials the UE supports. At 722, the UE 700 may authenticates itself to the OP 702, for example, using the jointly determined (e.g., chosen) protocol and/or credentials. The UE 700 may authenticate itself with various protocols such as, for example, OpenID/GBA or Digest AKA authentication.

At 724, the OP may assert the identity and redirect the UE/user 700 back to the RP 704 with the signed assertion message (at 726). The assertion message may comprise the authentication protocol and/or credentials and various other information such as, for example, time of last authentication and the like. At 728, the RP 704 may determine whether the reported (received) protocol and/or credentials matches the requested (desired) authentication protocol and/or credentials, or whether another authentication protocol and/or credentials was selected during negotiations between the OP 702 and the UE 700.

In an example embodiment, the protocol flow for negotiation and selection of user authentication protocols and/or credentials (shown in FIG. 7) may comprise an MNO/OP as the OP 702. Referring to FIG. 7, the user (e.g., UE 700) may attempt to login to the RP 704 at 706. For example, the user may visit the RP 704 and may provide his OpenID identifier to the RP 704. The RP may initiate the OpenID protocol with the MNO/OP. The RP may indicate, by using PAPE, the authentication method(s) or characteristics of such method(s) that it requires or prefers. At 708, the RP 704 may select an authentication protocol, for example, based on policy and/or based on a service for which the user requests access. For example, the RP 704 may determine (e.g., based on the provided OpenID identifier) one or more user authentication protocols and/or credentials that the RP may require and/or prefer. In an example embodiment, the RP 704 may determine general characteristics that the RP 704 may require and/or prefer. One or more authentication protocols and/or credentials may comprise such characteristics.

Alternatively, the RP 704 may provide no indication of required or preferred authentication protocols or characteristics according to an example embodiment. For example, the MNO/OP may retrieve the RP's specific requirements and/or preferences corresponding to authentication protocols/characteristics and/or credentials. The MNO/OP may retrieve such information from a database it may access and/or it owns. For example, the MNO/OP may have a prior relationship with, and knowledge of, an RP (e.g., by enrolling RPs to its database). The MNO/OP may determine the specific requirements and/or preferences on the authentication protocols/characteristics for a specific RP without receiving an indication from the RP.

At 716, the RP 704 and the MNO/OP may negotiate whether the RP's desired (or preferred) authentication protocols and/or credentials may be implemented. For example, the MNO/OP and the RP 704 may jointly determine whether the desired protocol may be fulfilled according to OpenID extensions such as PAPE. For example, the MNO/OP may promote which protocols are supported, and the RP may then require one of the supported protocols. At 718, the MNO/OP may initiate OpenID authentication with the UE/user 700.

For example, at 720, the UE 700 and the MNO/OP may negotiate an authentication protocol and/or credentials (e.g., via HTTP headers). For example, the MNO/OP and/or the UE 700 may negotiate to determine whether the UE supports the desired authentication protocol. In such a negotiation, the UE may inform the MNO/OP which protocols of authentication it supports. After the negotiation, a final authentication protocol may be chosen. The negotiation and final selection may be conducted such that the MNO/OP's policy is satisfied. In an example embodiment, the MNO/OP might know which authentication protocols and/or credentials the UE 700 supports and/or the MNO/OP may dictate an authentication of its own choice. Such a chosen authentication protocol and/or credentials may be chosen according to a policy of the MNO/OP.

At 722, the UE 700 may authenticate itself to the MNO/OP, for example, using the negotiated and/or chosen protocol and/or credentials. The UE 700 may authenticate itself with various protocols such as, for example, OpenID/GBA or Digest AKA authentication.

At 724, the MNO/OP may assert the identity and redirect the UE/user 700 back to the RP 704 with the signed assertion message (at 726). The MNO/OP may indicate to the RP (e.g., via the PAPE), the executed authentication protocol and/or credentials and additional information such as, for example, time of last authentication and the like. At 728, the RP 704 may determine whether the reported (received) protocol and/or credentials matches the requested (desired) authentication protocol/characteristics and/or credentials. For example, based on the determination, the RP 704 may determine whether to authorize the UE 700 to access the requested service. For example, if the RP 704 determines that the received protocol matches the desired authentication protocol and/or comprises desired characteristics, the RP 704 may allow the UE 700 to access a service provided by the RP 704.

As described herein, a service provider (e.g., RP) and an authentication endpoint (AEP) such as, for example, an OP, may negotiate the authentication protocol and/or credentials that the AEP and the UE use. For example, banks acting as RPs may prefer to utilize a strong authentication protocol. A service provider may select an authentication protocol based on a variety of determinations.

For example, if an OP has a prior relationship with, and/or knowledge of, an RP (e.g., by enrolling RPs to its database), the OP may already know the specific requirements/preferences for authentication protocols/characteristics corresponding to a specific RP. The OP may retrieve such information from a database it owns and/or it may access. In such an embodiment, where the OP has prior knowledge of an RP, the RP and OP may determine authentication without negotiating with each other. In an alternative embodiment, the OP may get information associated with the RP's requirements and/or preferences via a retrieval from a database, via an out-of-band update of the database information by direct (e.g., scheduled) contacts with the RP, or a combination thereof.

In an example embodiment in which the AEP is an OP operated by an MNO (MNO/OP), the MNO may have knowledge associated with specific authentication protocols and/or credentials that may be supported by a device and/or a subscriber. In an example embodiment, the MNO may advertise, to the RPs, specific authentication protocols and/or credentials that each subscriber may support. Such an advertisement may allow the RP to make a fine-grained decision on the desired authentication protocol and/or credentials. In an example embodiment, the service provider (e.g., RP) may provide a desired high-level policy profile instead of specifying a desired authentication protocol. In such an embodiment, the MNO/OP may select the strongest authentication protocol and/or credentials available. For example, the MNO/OP may use GBA_U instead of GBA_ME. Alternatively, the MNO/OP may select an authentication protocol of lower strength, for example, based on circumstances and/or additional policies that may require the use of a lower strength authentication protocol. For example, policy parameters that may influence authentication protocol selection comprise parameters such as, for example, battery state, signal state, roaming state of the device, location of the device, and the like. In an embodiment in which the MNO does not use the strongest authentication protocol, the MNO may signal the authentication protocol to the RP, for example, in the assertion message.

During negotiation between a service provider (e.g., RP) and an AEP (e.g., OP), or during an AEP's retrieval of the service provider's requirements and/or preference information from a AEP-accessible database, the requirements or preference information regarding user authentication may be provided via indication of a specific authentication protocol(s) (e.g., OpenID/SIP-Digest, OpenID/GBA, and the like) and/or via indication of broad characteristics. It may be required and/or preferred that such characteristics are comprised as part of a specific authentication protocol and/or credentials. For example, a characteristic may indicate that an authentication credential should be at least 128-bit strong and/or protected in a tamper-resistant environment. Multi-factor authentication may qualify as a characteristic of an authentication protocol according to an example embodiment. In an example embodiment in which the authentication requirements or preferences may be stated in terms of characteristics, the OP, after obtaining (e.g., via OP-RP negotiation or by database retrieval) the required or preferred "characteristics of user authentication," may translate the stated characteristics into a selection of specific supported authentication protocol and/or credentials.

An OP and the UE may agree on the authentication protocol and/or credentials to use. In an example embodiment, the user may have registered an OpenID identifier with the OP (e.g., MNO), the OP may know (e.g., based on the user's OpenID identifier received from the RP during discovery and association) which user may authenticate. In such an embodiment, the MNO may look up information on supported authentication protocols and/or credentials corresponding to the given user. For example, based on an enrollment in which the authentication credential may be enabled (e.g., bootstrapping with the BSF may have taken place in a GBA implementation, SIP password may have been created in an SIP Digest implementation), the MNO may determine which authentication protocols and/or credentials may be supported by the device and may update this information accordingly. For example, the supported authentication protocols and/or credentials may be stored in a database at the OP and/or in a database (e.g., SSO subsystem) at the MNO. Such a database may store a mapping between user identifiers and supported and/or enabled authentication protocols and/or credentials. Table 1 shows an example database for storing authentication protocols. The OP may select the authentication protocol which may best fit the requirements and/or preferences of the RP. The OP may challenge the UE with an authentication request that may be appropriate and may correspond to the selected authentication protocol (e.g., appropriate for Digest AKA, for HTTP Digest, and the like). In an example embodiment, the authentication protocols may be listed in order of a preferred priority or may comprises a preferred use order list.

TABLE 1

| User ID | Authentication Protocols | Last Login | ... | |
|---|---|---|---|---|
| openid.mno.com/joe | HTTP Digest AKA, GBA, username/ password, ... | 10.20pm 03-05-2011 | | additional data |
| openid.mno.com/jane | SIP Digest, username/ password | 9.15am 03-05-2011 | | |
| ... | | | | |

In an example embodiment, a UE may inform the AEP (e.g., OP) of supported authentication methods via header information in HTTP request messages. An example of such a header may include text strings such as, for example, "openid-gba", "openid-aka", "openid-sip-digest", "opened-eap", and the like. For example, the HTTP User-Agent header may be used and may comprise indications of supported GBA forms to an NAF.

Authentication protocol negotiation may be implemented via tools and standards with or without modifications. Although negotiations herein are often described in the context of OpenID, embodiments are not so limited. For example, an RP may refer to an embodiment of a service provider, and an OP may refer to an example embodiment of an AEP. Negotiations described herein may comprise interactions between a UE and an RP, a UE and an OP, and/or an RP and an OP.

The Provider Authentication Policy Exchange (PAPE) extension to OpenID may enable RPs to request a specific authentication policy to be applied, by the OP, when authenticating the user. The RP may request previously agreed upon authentication policies to be applied by the OP. The OP may inform the RP what authentication policies were used.

As an extension, PAPE may require no changes to the OpenID Authentication protocol and may be used with various OpenID Authentication versions such as, for example, versions 1.1 and 2.0.

Table 2 shows an example XRDS document according to an example embodiment. As shown, the portions highlighted in bold indicate support for PAPE extension (phishing resistant). During the Yadis discovery process, the OP advertises the supported authentication policies in the user's XRDS document. The RP may choose from one of the available authentication policies. Policies are advertised in the XRDS document by adding the policy as the value of an <xrd:Type> element of an OpenID <xrd:Service> element.

TABLE 2

<?xml version="1.0" encoding="UTF-8"?>
<xrds:XRDS
    xmlns:xrds="xri://$xrds"
    xmlns="xri://$xrd*($v*2.0)">
  <XRD>
    <Service priority="0">
      <Type>http://specs.openid.net/auth/2.0/signon</Type>
      <Type>http://openid.net/signon/1.0</Type>
      <Type>http://schemas.openid.net/pape/policies/2007/06/phishing-resistant</Type>
      <URI>http://openid.novalyst.de/openidserver</URI>
      <LocalID>http://openid.novalyst.de/id/joe</LocalID>
    </Service>
  </XRD>
</xrds:XRDS>

There may be pre-defined policies and/or policy identifiers specified in PAPE. In an example embodiment, the RP may define its own PAPE policies and/or policy identifiers. For example, the RP may indicate such PAPE policies and/or policy identifiers by publishing them on its website(s) and/or by proprietary interfaces (e.g., channels) with individual OPs. The policies, including the desired authentication protocols and/or credentials for example, may be defined by the RP. Such policies may be similar to policies that the MNO may define. In an example embodiment, the RP may upload a policy definition to its own URL (e.g., www.example.com/policies/policy1). After uploading, the RP may include the URL (to the self-defined policy) in the PAPE request.

In an example embodiment, the RP may indicate policy requirements and/or preferences explicitly. For example, the RP may indicate policy requirements and/or preferences on a per session basis via use of the PAPE. In an alternative embodiment, policy requirements and/or preferences may be shared with an OP that the RP may have a relationship with, and the OP may maintain a database or databases to log such policy requirements and/or policy preferences. Multiple policy identifiers (IDs) associated with multiple RPs may be stored in such databases, and policy information associated with multiple RPs may be stored and retrieved via database lookups. The RP and OP may understand the policies and policy identifiers and may have previously agreed upon policies. Table 3 lists example policies that may be defined in PAPE.

TABLE 3

| Name | Policy Identifier | Policy Description |
|---|---|---|
| Phishing-Resistant Authentication | http://schemas.openid.net/pape/policies/2007/06/phishing-resistant | An authentication mechanism where the End User does not provide a shared secret to a party potentially under the control of the Relying Party. (Note that the potentially malicious Relying Party controls where the User-Agent is redirected to and thus may not send it to the End User's actual OpenID Provider). |
| Multi-Factor Authentication | http://schemas.openid.net/pape/policies/2007/06/multi-factor | An authentication mechanism where the End User authenticates to the OpenID Provider by providing over one authentication factor. Common authentication factors may be something you know, something you have, |

TABLE 3-continued

| Name | Policy Identifier | Policy Description |
|---|---|---|
| Physical Multi-Factor Authentication | http://schemas.openid.net/pape/policies/2007/06/multi-factor-physical | and something you are. An example would be authentication using a password and a software token or digital certificate. An authentication mechanism where the End User authenticates to the OpenID Provider by providing over one authentication factor where at least one of the factors is a physical factor such as a hardware device or biometric. Common authentication factors are something you know, something you have, and something you are. An example would be authentication using a password and a hardware token. |

According to an example embodiment, policy profiles may be defined that comprise specific and fine-grained requirements for user authentication. Table 4 comprises an example of definitions and classifications for exemplary protocols. If the OP is operated by an MNO, for example, the OP may have access to mobile network and device specific authentication mechanisms (e.g., such as GBA to authenticate the UE), and/or browser (or non-browser) applications and clients that may be capable of retrieving, from secure storage, and employing credentials (e.g., to locally authenticate the user).

TABLE 4

| Protocol | User Authentication | Device (UE) Authentication | Mutual Authentication | Authentication Strength |
|---|---|---|---|---|
| GBA Digest | X | | X | Medium |
| GBA (GBA_U, GBA_ME) | | X | X | High |
| EAP-SIM | | X | X | High |
| EAP-AKA, EAP-AKA' | | X | X | High |

Table 5 shows example classifications (characteristics) of authentication protocols for policy profiles, according to an example embodiment.

TABLE 5

| Protocol | Phishing-Resistant | Multi-Factor | Physical Multi-Factor |
|---|---|---|---|
| Password via HTTPS | | | |
| PIN and digital certificate via HTTPS | X | X | |
| PIN and "soft" OTP token via HTTPS | X | X | |
| PIN and "hard" OTP token via HTTPS | X | X | X |
| PIN and "hard" crypto token via HTTPS | X | X | X |

In an example embodiment, the RP may include the preferences for the authentication protocol and/or credentials in the OpenID authentication request, for example, by including additional parameters in the request. Examples of such parameters are shown in Table 7. The RP may request that the last active user authentication have occurred within a specified time frame (e.g., within some number of seconds relative to the current authentication protocol run). Table 6 provides an exemplary overview of request parameters and their usage by RPs in PAPE, according to an example embodiment.

TABLE 6

| Name | Value |
|---|---|
| openid.ns.pape | "http://specs.openid.net/extensions/pape/1.0" needed if PAPE is to be used |
| openid.pape.max_auth_age | If the End User has not actively authenticated to the OP within the number of seconds specified in a manner fitting the requested policies, the OP may authenticate the End User for this request. Value: Numeric value greater than or equal to zero in seconds. The OP should realize that not adhering to the request for re-authentication most likely means that the End User will not be allowed access to the services provided by the RP. |
| Openid.pape.preferred_auth_policies | Zero or more authentication policy URIs that the OP may conform to when authenticating the user. If multiple policies are requested, the OP SHALL try to satisfy as many as it can. If no policies are requested, the RP is interested in other information such as the authentication age. Value: Space separated list of authentication policy URIs. |

Table 7 comprises additional (e.g., in addition to the example request parameters shown in Table 6) example request parameters according to an example embodiment.

TABLE 7

| Name | Value |
| --- | --- |
| openid.pape.last_auth_time | (Optional) If the End User has not actively authenticated to the OP since the time specified in a manner fitting the requested policies, the OP authenticates the End User associated with this request parameter. Value: time of last authentication. The OP may realize that not adhering to the request for re-authentication most likely means that the End User will not be allowed access to the services provided by the RP. |
| Openid.pape.max_auth_age_by_device | (Optional) If the End User has not been actively authenticated by the user device within the number of seconds or optionally since the time specified in a manner fitting the requested policies, the OP authenticates the End User associated with this request. Value: Numeric value greater than or equal to zero in seconds or optionally the time of the authentication. The OP should realize that not adhering to the request for re-authentication most likely means that the End User will not be allowed access to the services provided by the RP. |

In an example embodiment, a request for authentication within a specified number of tries may be included in an extension of the PAPE. As described herein, the OP may receive the user authentication requirements and/or preference policy information from the RP. The OP's authentication response may comprise information on the authentication protocol, for example, employed between itself and the user/UE. The authentication response may be sent to the RP after user authentication. The OP may convey information associated with the authentication policies that were applied. For example, freshness information (e.g., the time when the user was last authenticated) and information on the strength of the authentication (e.g., the NIST assurance level) may be conveyed. Additional parameters such as, for example, a parameter indicating the number of retries between the two recent successful authentications, may be extended into the PAPE protocol. Table 8 shows example OP response parameters in PAPE according to an example embodiment.

TABLE 8

| Name | Value |
| --- | --- |
| openid.ns.pape | "http://specs.openid.net/extensions/pape/1.0" needed if PAPE is to be used |
| openid.pape.auth_policies | One or more authentication policies URIs that the OP conformed to when authenticating the End User. The parameter may comprise a space separated list of authentication policy URIs. Example: openid.pape.auth_policies= http://schemas.openid.net/pape/policies/2007/06/multi-factor http://schemas.openid.net/pape/policies/2007/06/multi-factor-physical http://www.3gpp.org/auth-specs/multi-factor-physical-gba-u The above example may let the RP know that GBA UICC has been used for authentication, which may fulfill the property of being multi-factor physical authentication (e.g., which is a multi-factor authentication). In an example embodiment, if no policies were met and the OP wishes to convey other information in the response, this parameter may be included with an empty value. |
| openid.pape.auth_time | The most recent timestamp when the End User has actively authenticated to the OP in a manner fitting the asserted policies. Value: The timestamp may be formatted as specified in section 5.6 of [RFC3339], and may be formatted according to the following restrictions in the UTC time zone, indicated with a "Z". Times may not comprise fractional seconds according to an example. |
| openid.pape.auth_level.ns.<cust> | The name space for the custom Assurance Level defined by various parties, such as a country or industry specific standards body, or other groups or individuals. Value: URL that represents this Assurance Level. |
| openid.pape.auth_level.<cust> | The Assurance Level as defined by the above standards body, group, or individual that corresponds to the authentication protocol and policies employed by the OP when authenticating the End User. A custom Assurance Level definition may define additional subparameter values that are expressed within its |

TABLE 8-continued

| Name | Value |
|------|-------|
|      | namespace, although for reasons of simplicity, this may be avoided.<br>Value: Strings defined according to this Assurance Level. |

The RP may determine (e.g., based on the data received from the OP) whether the requirements for the login are met or not. Based on the determination (e.g., if the login requirements are met) the RP may grant access to the service. In an example embodiment, if the RP determines the requirements are not met, the RP may deny access to the service. The manner of determining whether the requirements for the login are met may be implementation specific according to the needs of the RP.

In an example embodiment, a mobile network may define mobile network specific policies. For example, mobile network specific policies may allow for fine-grained definitions of authentication properties and/or characteristics. Table 9 lists example policy names, identifiers, and descriptions according to an example embodiment. Such policies may be implemented via PAPE.

such a definition, the details of the actual authentication variant may defined as described in Table 10, according to an example embodiment.

TABLE 10

| Auth Level | Description |
|------------|-------------|
| cert | An authentication that relies on a certificate securely stored on the user device |
| gba-u | Authentication using the credentials in a UICC on a mobile phone using GBA_U |
| gba-me | Authentication using the credentials in a UICC on a mobile phone using GBA_ME |
| eap-sim | Authentication using the credentials in a SIM card on a mobile phone using EAP-SIM |

TABLE 9

| Name | Policy Identifier | Policy Description |
|------|-------------------|--------------------|
| Multi-Factor Authentication-cert | http://schemas.openid.net/pape/policies/2007/06/multi-factor-cert | An authentication mechanism where the End User may authenticate to the OpenID Provider by providing an authentication factor, e.g., using a certificate securely stored on the user device. |
| Physical Multi-Factor Authentication-GBA | http://www.3gpp.org/auth-specs/multi-factor-physical-gba-u | An authentication mechanism where the End User may authenticate to the OpenID Provider by providing over an authentication factor. For example, authentication using a password and the credentials in a UICC on a mobile phone using GBA-U. |
| Physical Multi-Factor Authentication-GBA | http:// www.3gpp.org/auth-specs/multi-factor-physical-gba-me | An authentication mechanism where the End User may authenticate to the OpenID Provider by providing an authentication factor. For example, authentication using a password and the credentials in a UICC on a mobile phone using GBA-ME. |
| Physical Multi-Factor Authentication-EAP-SIM | http:// www.3gpp.org/auth-specs/multi-factor-physical-eap-sim | An authentication mechanism where the End User may authenticate to the OpenID Provider by providing an authentication factor. For example, authentication using a password and the credentials in a SIM card on a mobile phone using EAP-SIM. |
| Physical Multi-Factor Authentication-ISIM | http:// www.3gpp.org/auth-specs/multi-factor-physical-isim | An authentication mechanism where the End User may authenticate to the OpenID Provider by providing an authentication factor. For example, authentication using a password and the credentials in an ISIM function on a UICC on a mobile phone. |

Separate polices may differ in that different authentication protocols and/or credentials may be provided by the mobile device (UE) and/or the mobile network. In another example embodiment, the aforementioned authentication protocols (e.g., referred to in Table 9) may be defined as a custom assurance level namespace. Since the exemplary mobile network specific policies in Table 9 define characteristics of one of the larger policies (e.g., they fall into the set of multi-factor or physical multi-factor authentication), it may be sufficient to require a standardized profile of multi-factor or physical multi-factor authentication and define a custom assurance level namespace which comprises details, for example, on whether protocols such as GBA, AKA, EAP-SIM, and the like may have been used as the actual underlying authentication protocol. For example, a custom assurance level namespace may be defined as http://3gpp.org/auth/types. In TABLE 10-continued

| Auth Level | Description |
|------------|-------------|
| eap-aka | Authentication using the credentials in a SIM card on a mobile phone using EAP-AKA |
| isim | Authentication using the credentials in an ISIM function on a UICC on a mobile phone |

The OP may advertise support for the namespace by publishing the XRDS document for its users as, for example:

```
<xrd>
  <Service>
    <Type>http://specs.openid.net/auth/2.0/signon</Type>
    <Type>
http://3gpp.org/auth/types
    </Type>
```

-continued

```
    <Type>
    http://schemas.openid.net/pape/policies/2007/06/multi-factor
      </Type>
    <Type>
    http://schemas.openid.net/pape/policies/2007/06/multi-factor-physical
      </Type>
      <URI>https://example.com/server</URI>
    </Service>
</xrd>
```

After support for the namespace is advertised, the RP may request that a multi-factor authentication policy may be applied with a specific assurance level. For example, such a request may be implemented by setting the parameters as shown in Table 11.

TABLE 11

| Parameter | Value |
| --- | --- |
| openid.ns.pape | http://specs.openid.net/extensions/pape/1.0 |
| openid.pape.max_auth_age | Maximum acceptable amount of seconds since last authentication |
| openid.pape.preferred_auth_policies | http://schemas.openid.net/pape/policies/2007/06/multi-factor-physical (e.g., to request physical multi-factor authentication) |
| openid.pape.auth_level.ns.3gpp | http://3gpp.org/auth/types (e.g., to request the use of the 3GPP namespace) |
| openid.pape.preferred_auth_level_types | 3gpp |

After successful user authentication, the OP may report (e.g., in the response message) the authentication level that may have been used. For example, Table 12 shows an example of parameters that may indicate that GBA-U was used.

TABLE 12

| Parameter | Value |
| --- | --- |
| openid.ns.pape | http://specs.openid.net/extensions/pape/1.0 |
| openid.pape.auth_policies | http://schemas.openid.net/pape/policies/2007/06/multi-factor-physical to request physical multi-factor authentication |
| openid.pape.auth_time | Timestamp of most recent authentication |
| openid.pape.auth_level.ns.3gpp | http://3gpp.org/auth/types to signal the use of the 3GPP namespace |
| openid.pape.auth_level.3gpp | gba-u to signal that GBA-U has been used as the underlying authentication mechanism |

An AEP (e.g., OP) and a UE may use HTTP headers to select an authentication protocol and/or credentials. For example, the OP may select a specific authentication protocol that the UE/user may use. For HTTP based authentication mechanisms (e.g., HTTP Basic Auth and Digest Authentication, SIP Digest and Digest AKA), authentication may be requested using a HTTP message with the response code "401 Unauthorized." The WWW-Authenticate header may signal the authentication protocol to be used. The WWW-Authenticate may include an authentication challenge and additional information such as, for example, the realm (which may allow a display to users of which username to use), the domain specifying the protection space, algorithm to be used, and the like. Parameters that may be needed for the authentication challenge may be included in the 401 HTTP response from the OP to the UE, such as described in section 3.2.1 of IETF RFC 2617.

In an example embodiment in which HTTP Digest AKA may be implemented, the client may be directed to use AKA for authentication instead of a standard username/password system. For example, the algorithm directive of the Digest Authentication (described in, for example, RFC 2617) may be overwritten by setting algorithm=AKAv1-MD5 (described in, for example, section 3.1 of IETF RFC 3310). To transfer the additional AKA specific authentication challenge parameters, the nonce directive of RFC 2617 may be extended by setting it to the Base64 encoding of the concatenation of the AKA authentication challenge RAND, the AKA AUTN token, and/or some server specific data (described in, for example, section 3.2 of IETF RFC 3310).

Table 13 shows an example sever response carrying a 401 unauthorized message. An OP server may send multiple challenges in a single HTTP 401 Authenticate message, and each challenge may use a different authentication scheme (described in, for example, section 4.6 of RFC 2617). This allows for a negotiation, for example, in that the OP server may indicate multiple authentication schemes and the UE client may then choose a scheme, for example the strongest authentication scheme, that is supported on the client side (described in, for example, section 4.6 of RFC 2617). HTTP messaging may allow for multiple WWW-Authenticate challenges to be present in a message from the server (e.g., within the same WWW-Authenticate header or via multiple WWW-Authenticate headers within the same response). For example, the OP may send multiple challenges in a single message in one message header or by using multiple headers. According to an example embodiment, multiple challenges may be sent using authentication protocol identifiers. For example, a multi-header response from a server may comprise WWW-Authenticate: 3gpp-gba-uicc; WWW-Authenticate: 3gpp-gba-me; WWW-Authenticate: 3gpp-aka; and WWW-Authenticate: sip-digest. In an example embodiment, a single header response from a server may comprise WWW-Authenticate: 3gpp-gba-uicc; 3gpp-gba-me; and sip-digest. An example of a server response carrying a 401 Unauthorized message is shown in table 13.

TABLE 13

```
HTTP/1.1 401 Unauthorized
WWW-Authenticate: Digest
    realm="testrealm@host.com",
    qop="auth,auth-int",
    nonce="dcd98b7102dd2f0e8b11d0f600bfb0c093",
    opaque="5ccc069c403ebaf9f0171e9517f40e41"
```

The OP may influence which authentication protocol the UE may select, for example, by shaping the requests it may send to the UE. For example, based on its own database of records of UEs' authentication capabilities, the OP may know or suspect that a UE may be capable of supporting specific different authentications. The MNO may look up its own policy about how to select an authentication protocol, and may send an HTTP 401 Authenticate message that may comprise a request for the chosen authentication protocol. The OP may employ a policy whereby it selects the most secure authentication protocol from multiple possible authentication protocols. Alternatively, the policy of the OP may require selection of a user authentication protocol that may minimize over-the-air traffic volume and/or time (e.g., of occupying the OTA channel), minimize delay or latency, minimize battery power consumption, or any combination of these and/or other optimization factors. Tables 4 and 5 show examples of factors.

In OP-UE authentication according to an example embodiment, the UE and/or the browser agent of the UE may detect whether it may support an authentication protocol that may be required by the OP. The UE, for example, may indicate the result of such a detection, and may support the required authentication protocol. If multiple authentication protocols are sent in the 401 message from the OP server, the UE, as a client for example, may select a suitable authentication protocol. For example, a suitable authentication protocol may be the authentication protocol that provides the strongest level of authentication.

For example, the UE may include a phone subscribed to a particular OP which is also an MNO (MNO/OP). The MNO/OP may configure the UE through provisioning and/or remote configuration. For example, the MNO/OP may configure how the UE may select an authentication protocol. Such a configuration may favor protocols preferred by the OP and/or RP.

For example, the UE may comprise policy information. Such policy information may govern the how UE replies to multiple possible HTTP 401 Authenticate messages from the MNO/OP. Each of such messages may comprise a request for authentication, for example, using a specific user authentication protocol. For example, such a UE-configured policy may instruct the UE, when it gets a HTTP 401 Authenticate message for SSO authentication, to wait a pre-configured length of time to receive subsequent HTTP 401 Authenticate messages during the specified time. Each subsequent message may be comprised of their own SSO authentication command. The UE may be further instructed to choose the authentication protocol, among the multiple protocols that were indicated in the multiple received HTTP 401 Authenticate messages, according to pre-configured selection criteria such as, for example, "most secure", "least OTA traffic", "least battery-consuming" or the like.

An example of a preconfigured policy may be for the UE to reply to the first HTTP 401 Authenticate message comprising a request of an authentication protocol that the UE may support. Another example of a preconfigured policy may be for the UE to consider the HTTP 401 Authenticate message(s) as a list of preferred authentication protocols in order of priority, and the UE may be instructed to start inspection from the first to the last, stopping when arriving at an authentication protocol it supports and then using that protocol of authentication. Another exemplary preconfigured policy may instruct the UE to use an authentication protocol based on the pre-configured policies without the HTTP 401 Authenticate message(s) list of authentication protocols.

Successful negotiations (e.g., arriving at an acceptable authentication protocol) between the UE and the MNO/OP may be achieved with an intelligent browser. FIG. 8 shows an example message exchange for negotiations between a UE 800 and a MNO/OP 802. For example, if the server (MNO/OP) 802 and UE 800 know that they want to negotiate by using multiple messages, the UE may request a site at 804. At 806, the UE 800 may receive a 401 (Unauthorized) message back from the server, in which the WWW-Authenticate header may comprise the first challenge for the first proposed authentication protocol. In the response from the UE 800, at 808, the UE may add information to the Authorization header of the HTTP message, for example, to request a different authentication protocol to be proposed. In response, at 810, the server may send another 401 with a different WWW-Authenticate header which may comprise a challenge for the authentication protocol that matches the UE's and RP's requested authentication protocol (812).

Referring to FIG. 8, the response to an authentication request may be sent to the OP using a HTTP request, where the authorization header line may comprise the credential information. Table 14 shows an example response carrying authorization information.

TABLE 14

```
Authorization:
    Digest username="Mufasa",
    realm="testrealm@host.com",
    nonce="dcd98b7102dd2f0e8b11d0f600bfb0c093",
    uri="/dir/index.html",
    qop=auth,
    nc=00000001,
    cnonce="0a4f113b",
    response="6629fae49393a05397450978507c4ef1",
    opaque="5ccc069c403ebaf9f0171e9517f40e41"
```

In an example embodiment in which the UE may not be capable of implementing the requested authentication protocols, the UE may "fail gracefully" as described in, for example, section 3.4 of RFC 2617. In an example embodiment utilizing HTTP Digest AKA, the messages described above may be used. For example, when the UE receives a Digest AKA authentication challenge, the UE may extract the RAND and AUTN from the "nonce" parameter, and may assess the AUTN token provided by the server. If the UE successfully authenticates the server with the AUTN and determines that the SQN used in generating the challenge is within expected range, the AKA algorithms may run with the RAND challenge and shared secret K. The resulting AKA RES parameter may be treated as a "password" when calculating the response directive of RFC 2617 (described in, for example, RFC 3310).

The communication between the browsing agent and the ISIM application on the smartcard which calculates the AKA Digest is not specified in RFC 3310. For example GBA, which builds on HTTP Digest AKA, summarizes these functions in section 4.2.4 of 3GPP TS 33.220 v10.0.0. As described, the required functionalities from the UE are: the support of HTTP Digest AKA protocol; the capability to use both a USIM and an ISIM in bootstrapping; the capability to select either a USIM or an ISIM to be used in bootstrapping, when both of them are present; the capability for a Ua application on the ME to indicate to the GBA Function on the ME the type or the name of UICC application to use in bootstrapping (see clause 4.4.8); the capability to derive new key material to be used with the protocol over Ua interface from CK and IK; support of NAF-specific application protocol (for an example see TS 33.221).

Table 15 shows an example of protocol steps when using HTTP Digest AKA according to an example embodiment.

TABLE 15

1) Initial request
REGISTER sip:home.mobile.biz SIP/2.0
  2) Response containing a challenge
SIP/2.0 401 Unauthorized
WWW-Authenticate: Digest
    realm="RoamingUsers@mobile.biz",
    nonce="CjPk9mRqNuT25eRkajM09uT19nM09uT19nMz5OX25PZz==",
    qop="auth,auth-int",
    opaque="5ccc069c403ebaf9f0171e9517f40e41",
    algorithm=AKAv1-MD5
  3) Request containing credentials
REGISTER sip:home.mobile.biz SIP/2.0
Authorization: Digest
    username="jon.dough@mobile.biz",
    realm="RoamingUsers@mobile.biz",
    nonce="CjPk9mRqNuT25eRkajM09uT19nM09uT19nMz5OX25PZz==",
    uri="sip:home.mobile.biz",
    qop=auth-int,
    nc=00000001,
    cnonce="0a4f113b",
    response="6629fae49393a05397450978507c4ef1",
    opaque="5ccc069c403ebaf9f0171e9517f40e41"
  4) Successful response
SIP/2.0 200 OK
Authentication-Info:
    qop=auth-int,
    rspauth="6629fae49393a05397450978507c4ef1",
    cnonce="0a4f113b",
    nc=00000001
In the case that there is an AKA synchronization failure, the server sends a new challenge in step 4:
SIP/2.0 401 Unauthorized
WWW-Authenticate: Digest
    realm="RoamingUsers@mobile.biz",
    qop="auth,auth-int",
    nonce="9uQzNPbk9jM05Pb15Pb15DIz9uT19uT19jM0NTHk9uXk==",
    opaque="dcd98b7102dd2f0e8b11d0f600bfb0c093",
    algorithm=AKAv1-MD5

In an example embodiment, in a HTTP request from the UE to the OP (e.g., in the redirect from the RP to the OP), the UE may signal its capabilities (e.g., the supported authentication protocols and/or credentials) to the OP by using GBA techniques. For example, by appending a constant string as a product token to the User-Agent header in the request (as specified in section 3.8 and section 14.43 in RFC 2616), the UE may convey information to the OP. In GBA, the UE may communicate with a NAF, for example, by appending "3gpp-gba" for UE-based GBA or by appending "3gpp-gba-uicc" for UICC based GBA (described in, for example, section 5.3 in 3GPP 33.222). Table 16 shows an example HTTP GET request with modified User-Agent header.

TABLE 16

GET / HTTP/1.1
User-Agent: curl/7.19.7 (x86_64-pc-linux-gnu) 3gpp-gba-uicc
Host: example.com
Accept: */*

Additional product tokens may be defined to convey information on supported authentication protocols from the UE to the OP, for example, by appending the defined constant strings to the User-Agent header. Multiple strings may be attached for devices that may support multiple authentication protocols. Example constant strings for 3GPP specific authentication may be defined in specifications such as 3GPP 33.222. Other strings are defined according to an example embodiment. For example, table 18 shows example strings. In an alternative embodiment, the Pragma header may be used to convey information on supported authentication protocols from the UE to the OP. For example, the Pragma header may remain intact and unchanged by proxies and gateways (see, e.g., RFC 2616, section 14.32). Table 17 shows an example syntax of the Pragma header.

TABLE 17

Pragma    = "Pragma" ":" 1#pragma-directive
pragma-directive = "no-cache" | extension-pragma
extension-pragma = token [ "=" ( token | quoted-string ) ]

In an example embodiment that may utilize a Pragma header, the UE's browser may add "Pragma: 3gpp-gba-uicc 3gpp-gba-me", for example, to indicate in the header message that it supports UE and ME based GBA authentication protocols.

Although the example embodiments described herein are carried out in the context of OpenID, it is to be understood that the techniques described above may be applied to any number of single sign-on security protocols, such as Liberty Alliance. Additionally, while the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

Selection and Negotiation of Authentication Protocols in an Example GBA System

FIGS. 9-19 illustrate example embodiments in which authentication protocol negotiation and selection methods may be employed in a system that implements the Generic Bootstrapping Architecture (GBA).

In one embodiment, a GBA may provide a boot-strapping mechanism for authentication and key agreement for application security (e.g., 3GPP AKA mechanism for 2G and/or 3G) and may support authentication protocol negotiation in the UE and/or in GBA network elements of UICC and/or non-UICC based credentials. For example, network elements may select UICC-based credentials, non-UICC based credentials, or a combination thereof, based on the type of authentication supported by the UE and based on the application's policy and/or the MNO's policy. Embodiments described herein may support authentication protocol negotiation for GBA aware and/or GBA unaware UICC smartcards.

In an example embodiment, the HSS/HLR may comprise the MNO master database. Such a database may comprise subscriber profiles and the different authentication protocols that the UE may support (e.g., AKA, SIP Digest, and the like). In an example embodiment, the GBA architecture may assume that the UE uses one authentication protocol (e.g., UICC-based credentials (2G or 3G AKA) for GBA bootstrapping). In such an embodiment, the HSS may be the decision-maker. For example, the HSS may generate AKA authentication vectors and send vectors in response to the Multimedia-Auth-Request (MAR) (e.g., over the Zh interface between the BSF and the HSS). In an alternative embodiment, for example, in which the UE profile in the HSS indicates support of multiple authentication protocols, the UE may want to use one of the protocols for GBA bootstrapping. For example, the UE may support AKA and SIP Digest, and the UE may want to use SIP Digest-based GBA bootstrapping. In such an embodiment, there may be a need for authentication protocol negotiation, and the HSS may not be the authentication protocol decision maker. For example, selection of the authentication protocol may be performed by the UE and/or GBA network elements (e.g., NAF and/or BSF).

In the example GBA system described herein, in one embodiment, the authentication protocol may be negotiated and agreed upon by the UE and GBA entities such as, for example, NAF, BSF, and/or HSS/HLR. For example, the user equipment (UE) may send data, to a service provider or application server (e.g., NAF), that may specify authentication protocols and/or communication protocols that may be supported by the UE. The UE may receive a GBA message that may comprise a selected authentication protocol acceptable to the NAF. The UE may bootstrap a shared secret with a bootstrapping server function (BSF) using the selected GBA bootstrapping protocol. The UE may use GBA bootstrapped keys shared with the BSF to derive credentials to use for authentication with the NAF, and the UE may establish a secure channel with the NAF based on the GBA created credentials.

Figure 18:
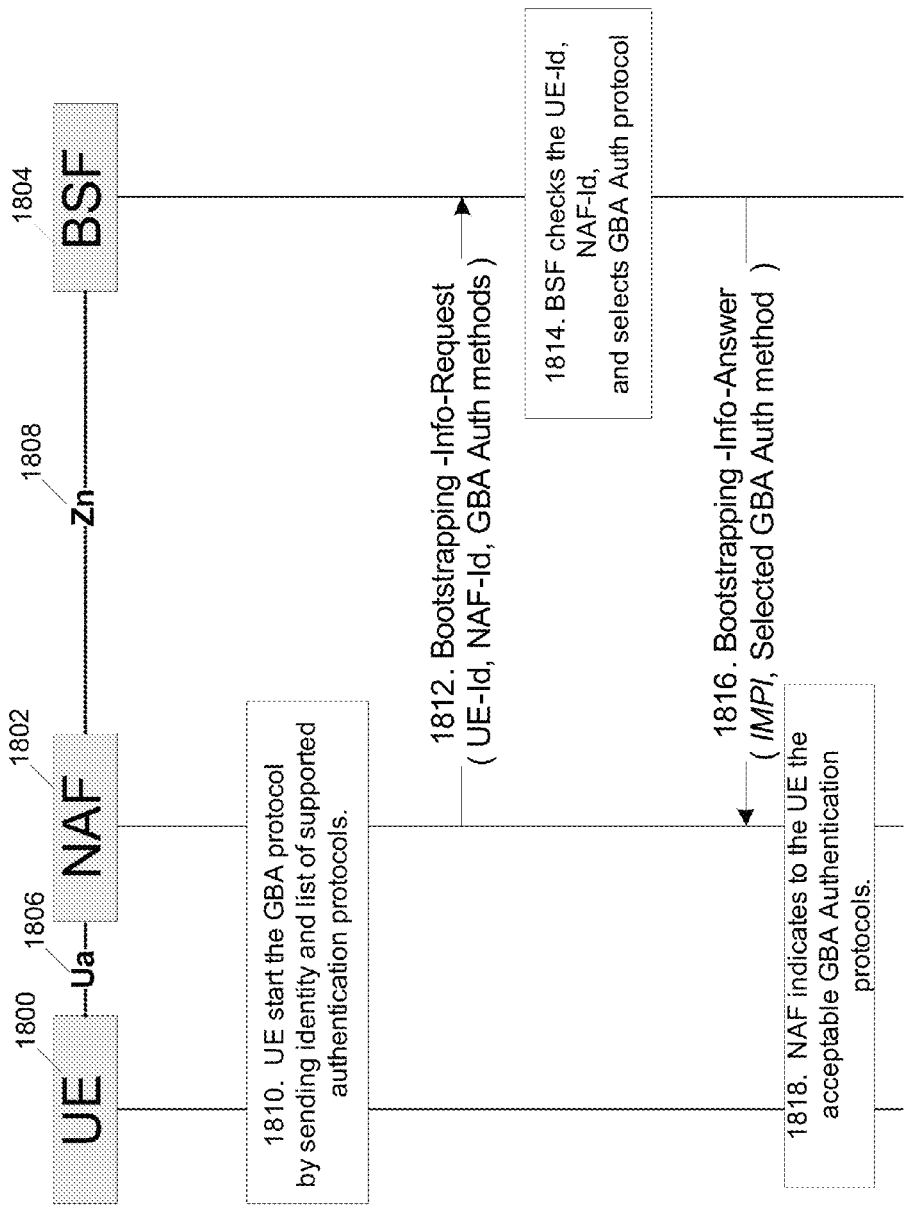
FIG. 18 illustrates an example embodiment of a message flow for GBA bootstrapping protocol negotiations.

According to embodiments described herein, a protocol flow (such as shown in FIG. 18), may be implemented which may involve entities such as, for example, a user equipment (UE), a BSF, and/or a network access function (NAF). Such a protocol flow may cover negotiations for arriving at a mutually acceptable authentication protocol and/or for including the associated bootstrapping and/or follow-on authentication. Such a protocol may implement a GBA protocol that may comprise negotiation between the UE and the NAF. In other example protocol flows, negotiations may take place between the UE and the BSF.

According to an example embodiment, a service provider, such as an NAF entity for example, may receive information indicating GBA authentication protocols that may be supported by the UE. The NAF may select an available GBA authentication protocol from the supported GBA authentication protocols, and the NAF send a GBA message to the UE that may comprise the selected authentication protocol. The NAF may generate an appropriate error message, for example, if no authentication method supported by the UE is accepted. An example NAF may run a GBA protocol with the UE based on the selected authentication protocol.

Various embodiments described herein may be implemented by a BSF. For example, a BSF may receive information indicating GBA authentication protocols that may be supported by the UE. The BSF may select an acceptable GBA authentication protocol. The BSF may retrieve an appropriate authentication vector (AV) corresponding to the selected protocol, for example, from an operator's policy server (e.g., HSS/HLR). The BSF may bootstrap a shared secret with the GBA application running on the UE. The BSF may derive an application specific key based on the mutual pre-shared key. The BSF may send such a derived key and/or related user security settings (USS) to the requesting NAF.

According to an example embodiment, various GBA entities (e.g., BSF, NAF, Zn-Proxy) and/or various reference points (e.g., Ua, Ub, Zn, Zn', Zh) may support negotiation of UICC-based and/or non-UICC based authentication protocols. For example, UE and NAF negotiation to the Ua reference point may include expanded messaging that may reference possible authentication protocols. According to an embodiment, in a UE's request for service message to an NAF, the User-Agent header field may comprise a list of authentication protocols supported by the UE. In a 401 "Unauthorized" response from the NAF to a UE, for example, the WWW-Authenticate header may comprise a number of possible prefixes with the format "3GPP-gba-type-bootstrapping@" in the realm attribute. The prefix may indicate that a bootstrapped security association may be required and/or the prefix may provide the selected authentication protocol. This communication may involve the use of a multi-message negotiation between two entities for example. In an example embodiment, an NAF may use the algorithm field to indicate the selected authentication protocol and/or credentials.

An expanded message may be used, for example, to accommodate UE and BSF negotiation to the Ub reference point. Expanded messaging may reference possible authentication protocols. Described embodiments may use expanded messaging that may reference possible authentication protocols, for example, to accommodate BSF and NAF negotiation to the Zn and Zn' reference points. Expanded messaging may be used to reference possible authentication methods, for example, to accommodate BSF and HSS negotiation to the Zh reference point. According to an example embodiment, GBA entities and GBA reference points may be used to support automated authentication protocol (and/or credentials) negotiation and selection. Some embodiments provide negotiation and selection of authentication protocols for Single Sign-On (SSO) scenarios, where a user, for example, may communicate with an NAF which may function as an SSO Identity Provider (IdP) and/or an AEP.

Figure 9:
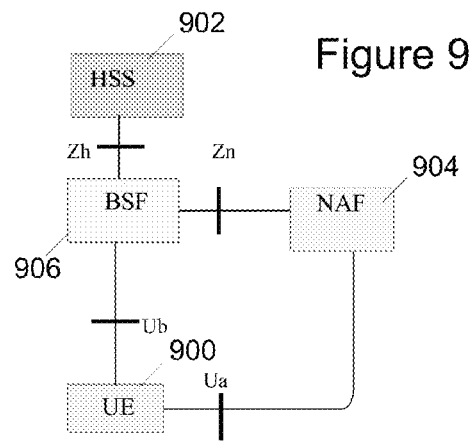
FIG. 9 illustrates an example block diagram of GBA network elements.

A GBA system (protocol) may enable user authentication, for example, by using the user's valid identity on the Home Location Register (HLR) and/or Home Subscriber Server (HSS). FIG. 9 illustrates an example of GBA elements. For example, GBA authentication may take place by having a network component challenge the UICC in the UE 900 and may verify that the answer is similar to one predicted by the HLR/HSS 902. GBA may be representative of a pre-shared key authentication protocol. According to an example embodiment, the bootstrapping server function (BSF) 906 may be an MNO network entity that may act as a mediator between two endpoints (e.g., UE 902 and NAF 904). For example, the BSF 906 may enable endpoints to establish a shared secret. Such a shared secret may be limited in lifetime.

Figure 10:
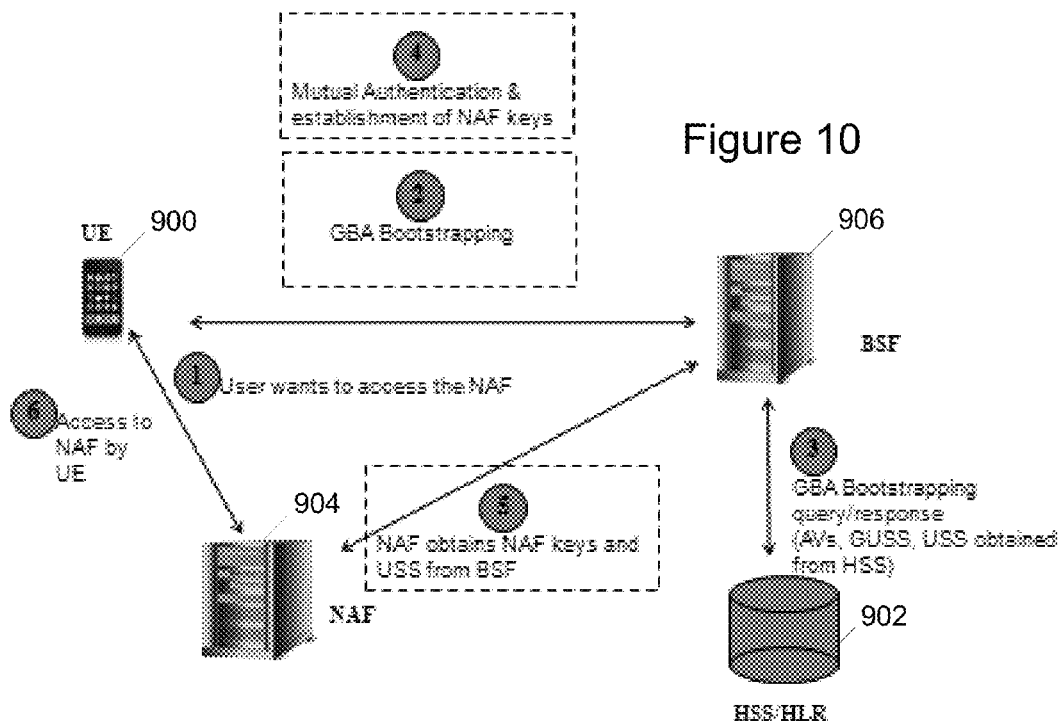
FIG. 10 illustrates an example message flow between GBA elements according to an example embodiment.

FIG. 10 illustrates an example message flow between GBA elements. Referring to FIG. 10, at 1, the user or UE 900 may request access to the NAF 904. The BSF 906 may mediate the GBA bootstrapping at 2. At 3, the HSS/HLR 902 may be queried by the BSF 906. The HSS/HLR 902 may respond with the GBA bootstrapping response at 3. At 4, the UE 900 and the BSF 906 may undergo mutual authentication and may establish NAF keys. At 5, the NAF 904 may obtain NAF keys and USS from the BSF 906. At 6, the UE 900 may access the NAF 904.

Figure 11:
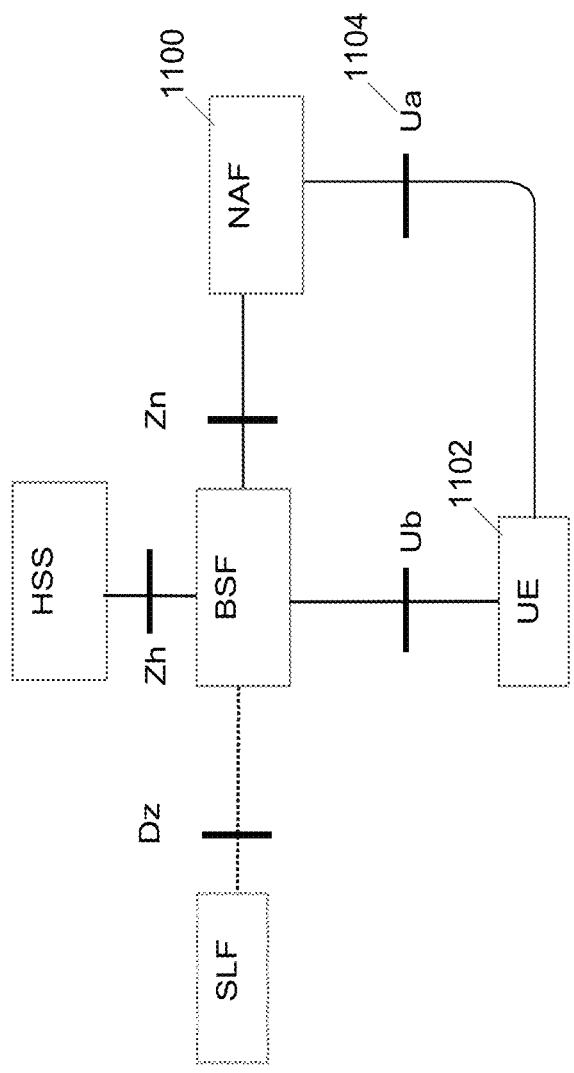
FIG. 11 illustrates a block diagram of an example GBA architecture that may be implemented in a home operator scenario.
Figure 12:
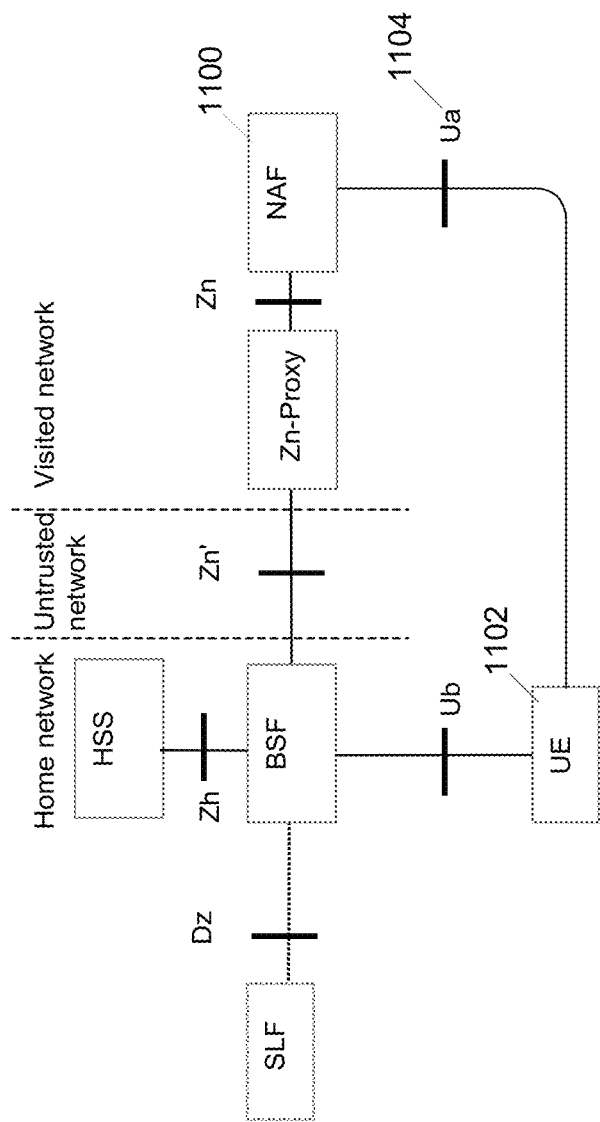
FIG. 12 illustrates a block diagram of an example GBA architecture that may be implemented in a roaming scenario.

In an example embodiment, a GBA system may be implemented that may enable negotiation and selection of a user/device authentication protocol. For example, the NAF 1100 (shown in FIG. 11) may select UICC and/or non-UICC based credentials. For example, the UE 1102 may declare that it supports a specific type of credential and/or it may declare that it supports UICC and/or non-UICC based credentials. The NAF 1100 may support the specific type of credential or it may support UICC and non-UICC based credentials. FIG. 11 illustrates a block diagram of an example GBA architecture that may be implemented in a home operator scenario, and FIG. 12 illustrates a block diagram of an example GBA architecture that may be implemented in a roaming scenario. user/device authentication method negotiation and/or selection using a home operator. GBA implementations (e.g., such as shown in FIGS. 11 and 12) described herein may enable authentication protocol negotiation and/or selection and may support UICC and non-UICC based credentials. Various embodiments for enabling such authentication protocol negotiation and/or selection described herein may comprise improved Ua reference points, Ub reference points, Zh reference points, Zn reference points, Zn' reference points, BSF functionalities, NAF functionalities, and/or Zn-Proxy functionalities.

Figure 13:
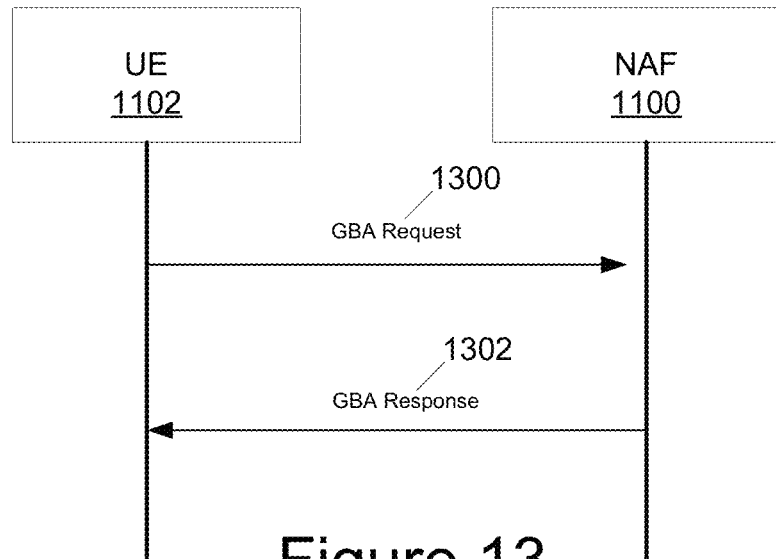
FIG. 13 illustrates an example GBA message flow between a UE and a Network Access Function (NAF)

Referring to FIGS. 11 and 12, the Ua reference point 1104 may enable negotiation of an authentication protocol between the UE 1102 and the NAF 1100. FIG. 13 illustrates an example GBA message flow between a UE and a NAF according to an example embodiment. Referring to FIG. 13, for example, the UE 1102 may start communication (e.g., over reference point Ua 1104) with the NAF 1100. For example, the communication at 1300 may indicate GBA authentication protocols that may be supported. The NAF 1100, at 1302, may reply with a selected GBA bootstrapping authentication protocol which it may accept. If none of the GBA authentication protocols that the UE 1102 supports may be acceptable to the NAF 1100, the GBA bootstrapping may be terminated with an error message. Any application protocol may be used over the Ua reference point 1104 (e.g., HTTP, SIP). For example, described herein is an embodiment for an authentication protocol negotiation via an HTTP-based Ua reference point, although embodiments are not limited to an HTTP based-protocol.

In an embodiment that may enable UE and NAF negotiation via an HTTP protocol over a Ua reference point, HTTP digest authentication may be used with GBA bootstrapped security association. An embodiment of the Ua interface described herein may enable the UE and the NAF to negotiate an authentication protocol to be used during GBA bootstrapping. The term bootstrapping protocol may be used to denote an authentication protocol. For example, a bootstrapping protocol may correspond to an authentication protocol.

In an example embodiment, a UE may indicate, to the NAF, the GBA bootstrapping protocols it may support by, for example, including a "product" token to the "User-Agent" header. An exemplary "product" token may take the general form "3gpp-gba-type." Several GBA protocols may be supported according to various configurations. In one example embodiment, a UE may comprise a GBA unaware UICC and may use the GBA_ME protocol. In such an embodiment, exemplary product tokens may comprise: "3gpp-gba-me-sim" (e.g., using SIM AKA); "3gpp-gba-me-usim" (e.g., using USIM AKA); and "3gpp-gba-me-isim" (e.g., using ISIM AKA). In another supported GBA protocol, the UE may comprise a GBA aware UICC and may use GBA_U. In such an embodiment in which a UE may comprise a GBA aware UICC, exemplary product tokens may comprise: "3gpp-gba-uicc-sim" (e.g., using SIM AKA); "3gpp-gba-uicc-usim" (e.g., using USIM AKA); and "3gpp-gba-uicc-isim" (e.g., using ISIM AKA). In another supported GBA protocol, the UE may not possess a UICC smartcard or the UICC may be present, but not accessible. In such an embodiment, an exemplary product token may comprise "3gpp-gba-sip-digest" (e.g., for non-UICC credentials using SIP Digest); and "3gpp-gba-http-digest" (e.g., for non-UICC credentials using HTTP Digest).

Figure 14:
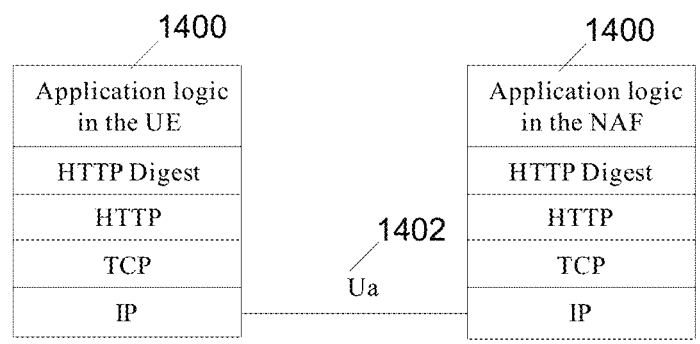
FIG. 14 shows an example protocol stack of a Ua interface.

The User-Agent header field comprising the list of authentication protocols supported by the UE in the "product" token may be ordered according to UE and/or operator configured policy, and/or may be added to an outgoing HTTP request for example. Upon receiving this "product" token, the NAF may decide and may select one of the authentication protocols that it accepts for authenticating the UE, for example, using an GBA-based authentication protocol. FIG. 14 shows an example protocol stack 1400 of the Ua interface 1402 according to an example embodiment when HTTP Digest authentication is used.

According to an example embodiment, an NAF may provide an indication, to the UE, using a realm attribute. NAF may indicate to the UE that a bootstrapped security association may be implemented, for example, by sending an HTTP response with code 401 "Unauthorized". The response may also comprise the WWW-Authenticate header. A "realm" attribute may comprise an example prefix described herein that may trigger the UE to run a boot-strapping protocol over the Ub interface using the selected authentication protocol of the general format "3GPP-gba-type-bootstrapping@" for example. Exemplary prefixes may comprise: "3GPP-gba-me-usim-bootstrapping@" (e.g., if the UICC is GBA unaware, using USIM AKA GBA bootstrapping security association); "3gpp-gba-me-isim-bootstrapping@" (e.g., if the UICC is unaware, using ISIM AKA GBA bootstrapping security association); "3gpp-gba-me-sim-bootstrapping@" (e.g., if the UICC is GBA unaware, using SIM AKA GBA bootstrapping security association); "3gpp-gba-uicc-usim-bootstrapping@" (e.g., if the UICC is GBA aware, using USIM AKA GBA bootstrapping security association); "3gpp-gba-uicc-isim-bootstrapping@" (e.g., if the UICC is GBA aware, using ISIM AKA GBA bootstrapping security association); "3gpp-gba-uicc-sim-bootstrapping@" (e.g., if the UICC is GBA aware, using SIM AKA GBA bootstrapping security association); "3gpp-gba-sip-digest-bootstrapping@" (e.g., for GBA type bootstrapping security association using non-UICC credentials using SIP Digest); and "3gpp-gba-http-digest-bootstrapping@" (e.g., for GBA type bootstrapping security association using non-UICC credentials using HTTP Digest). In an example embodiment, the NAF may also decide that none of the UE supported authentication protocols may be acceptable. In such a scenario, an appropriate error message for that indication may be provided.

In an alternative example embodiment, the NAF may provide an indication using an algorithm field. An algorithm field may be an alternative to the use of the User-Agent field. For example, an algorithm field may be used by the NAF to indicate the authentication protocol to be used. The NAF may comprise the desired protocol in the algorithm field of the HTTP 401 Unauthorized message to the UE. Message (1) illustrates an example of such a message:

---

Message (1):
HTTP/1.1 401 Unauthorized
WWW-Authenticate: Digest
realm="service1.home1.net",
nonce="base64 (RAND)",
qop="auth,auth-int",
opaque="6dae728da9089dab9112373c9f0a9731",
algorithm=ALGORITHM-VALUE

---

Referring to message (1), ALGORITHM-VALUE in message (1) may take various forms, such as one of the described variations of the format "3GPP-gba-type-bootstrapping@" for example.

Figure 15:
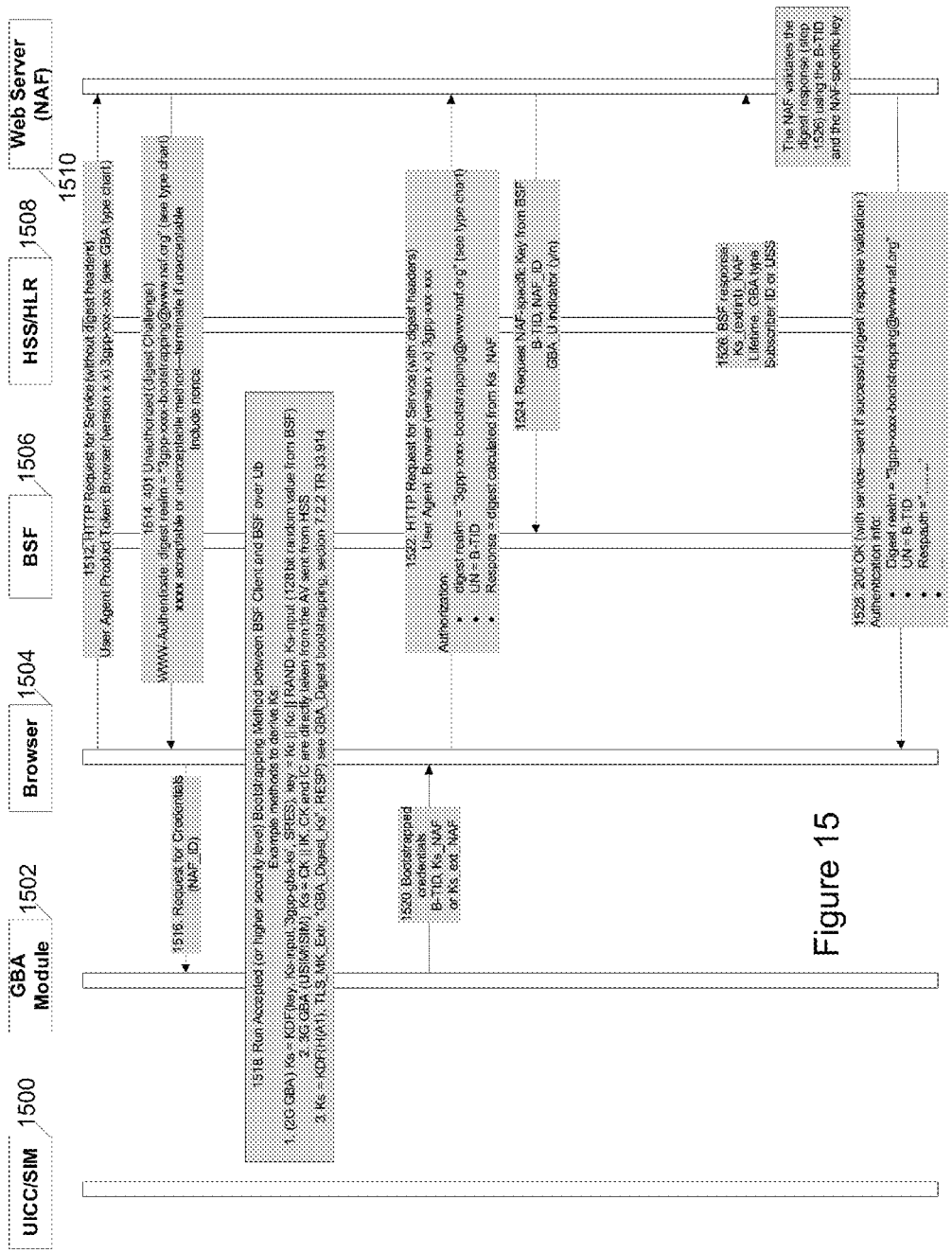
FIG. 15 illustrates an exemplary authentication protocol flow for a GBA according to an example embodiment.

FIG. 15 illustrates an exemplary authentication protocol flow for a GBA according to an example embodiment. The protocol flow in FIG. 15 may comprise negotiations between a UE (e.g., via browser 1504) and the NAF 1510 over Ua in coordination with the bootstrapping over Ub.

At 1512, an HTTP request for service message may be sent to the NAF 1510. A request for service message may be sent with or without digest headers. For example, a message may be sent without headers if using HTTP. The UE web browser 1504 may be assumed to know the NAF's ID, which may comprise its FQDN. In the request the browser 1504 may add one or more product tokens, for example, in the "User-Agent" header field (e.g., with the format '3gpp-xxx-xxx-bootstrapping') which may indicate the GBA bootstrapping protocols that it supports. For example, the product token may indicate that the UE requests the use of a GBA digest protocol. The product token may also indicate the authentication protocols, such as HTTP Digest for example, that the UE supports. The UE may provide an indication to the NAF 1510 that one or more GBA authentication protocols are supported by the UE. Table 18 illustrates an example of GBA protocols comprised in request messages:

TABLE 18

GBA Type Chart

3gpp-gba-me-usim-bootstrapping
3gpp-gba-me-isim-bootstrapping
3gpp-gba-me-sim-bootstrapping (2 G GBA with SIM card)
3gpp-gba-uicc-usim-bootstrapping
3gpp-gba-uicc-isim-bootstrapping
3gpp-gba-uicc-sim-bootstrapping (2 G GBA)
3gpp-gba-SIP digest-bootstrapping At 1514, the NAF 1510 may notice that the URL in the request may identify the service which may need authentication. The NAF 1510 may inspect the User-Agent header and/or may identify GBA-type capabilities of the UE. The NAF 1510 may send a response (e.g., HTTP) which may indicate that authentication may be needed. Within such a response the NAF 1510 may add a realm value (e.g., with the format '3gpp-xxxx-bootstrapping@www.naf.org') and/or may use the algorithm field to indicate one or more acceptable GBA protocols. For example, the UE may receive a code 401 response comprising a prefix header, and the prefix header may indicate that the UE is allowed to perform the GBA digest protocol that it may have requested. The NAF 1510 may provide an indication to the UE that one or more GBA authentication protocols are acceptable, for example, and an acceptable GBA authentication protocol may comprise a SIP Digest-based security association. If more than one protocol is indicated, for example, the NAF 1510 may prioritize the list. According to an embodiment, when the browser 1504 receives the NAF response it may check the prefix value of the realm and/or an algorithm field indication. If there is no bootstrapping indicated, the browser 1504 may prompt the user, for example, to enter a username and/or password. If the prefixes indicate bootstrapping, for example, the UE may check to determine if its capabilities meet requirements of the NAF 1510. If capabilities do not meet the requirements of the NAF 1510, for example, the UE may terminate the protocol. In an alternative embodiment, the protocol may not be terminated and the browser 1504 may re-initiate the protocol, for example, by resending the request message to the NAF 1510 to renegotiate a mutually acceptable bootstrapping protocol.

If the UE is able to perform a bootstrapping protocol acceptable to the NAF 1510, it may construct the NAF_ID at 1516. For example, the UE may receive a bootstrapping initiation message, via the NAF 1510, comprising a realm attribute to trigger the UE to run a bootstrapping protocol using a selected authentication protocol and/or credential. The NAF_ID constructed at 1516 may be the concatenation of the FQDN and a five octet long string which may identify the Ua security protocol. The browser 1504 may send a request, which may comprise the NAF_ID, to the GBA module 1502 for the bootstrapped NAF specific key(s). In the message at 1516, for example, the browser may indicate a GBA-type that may be associated with the requested session key.

At 1518, the GBA module 1502 may perform bootstrapping involving credentials. For example, the credentials may be on the UICC and/or on the ME (e.g., in an SIP Digest implementation). Bootstrapping may extend to a smartcard, for example, when card-based subscriber credentials are used. The bootstrapping may use the BSF 1506 and/or the HSS/HLR 1508 to establish the master session key (e.g., Ks). The GBA module 1502 may check whether the application requesting the NAF specific key is authorized to make such a request. A selected bootstrapping protocol as compared to UE and NAF negotiation is further described herein. For example, selection of a bootstrapping protocol may default to the highest security level of which the UE may be capable.

At 1520, the GBA module 1502 may derive the NAF-specific key(s) (e.g., Ks_NAF) and may deliver such keys to the browser 1504. Included with the key(s) may be the B-TID, key lifetime, and/or information indicating the GBA-type. The NAF-specific key (or keys) may be derived from Ks, the NAF_ID that may be provided by the browser, and/or other parameters, such as the private identity IMPI (e.g., reformatted from the IMSI if USIM credentials are used) and RAND for example. When the GBA_U protocol is implemented (performed), the Ks_int_NAF and the Ks_Ext_NAF may be computed on the UICC, and the Ks_Ext_NAF may passed to the GBA module 1502.

At 1522, after receiving the bootstrapped material from the GBA module 1502, the browser 1504 may prepare the digest response to the challenge (from 1514). The browser 1504 may use the original service request message with the calculated digest response parameters in the 'Authorization' header. The calculation may use the B-TID as the user name and the NAF-specific key as the password.

At 1524, the NAF 1510, which may have received the B-TID, may send the B-TID and its NAF_ID to BSF 1506, for example, to request the NAF-specific key. The NAF 1510 may request the user security settings (USS) with the GAA service identifier and may indicate whether it is GBA aware. The BSF 1506 may use the B-TID to fetch the keys. The BSF 1506 may use the B-TID, the NAF_ID, and/or other parameters to calculate the NAF-specific keys.

At 1526, the BSF 1506 may check to see whether the NAF 1510 requesting the NAF-specific key is authorized to use the received NAF_ID. If so, the BSF 1506 may locate the master session key Ks which may be identified by the B-TID, and it may proceed as in step 1520 to calculate the NAF-specific key(s). The BSF 1506 may send the calculated key(s) to the NAF 1510. According to an embodiment, the BSF 1506 may also send the IMPI and/or service specific user identities using the USS. The USS may comprise key usage requirements, for example, as dictated by the operator. Such usage requirement, for example, may require the use of the Ks_int_NAF. If such a specific key requirement is not issued, the keys coming out of negotiations from steps 1512 and/or 1514 may be used.

At step 1528, the NAF 1510 may validate the digest response, for example, by using the NAF-specific key received from the BSF 1506. The digest response may have been sent by the browser 1504 in step 1520 for example. In an embodiment, upon successful authentication of the user, the NAF 1510 may send the browser 1504 a 200 OK which may indicate authentication success and/or authorization for the user to access the service. The message may also comprise authentication information such as, for example, the B-TID and the digest realm.

Figure 16:
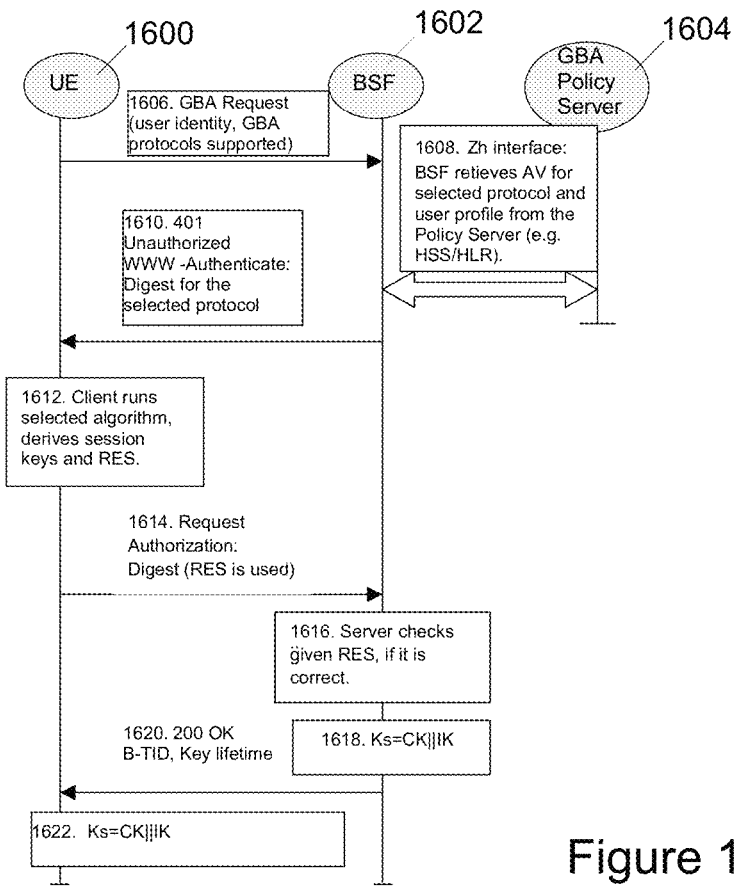
FIG. 16 illustrates an example message flow for negotiating an authentication protocol according to an example embodiment.

In an example embodiment, the Ub reference point may enable authentication negotiation between the UE and the BSF. FIG. 16 illustrates an example message flow for negotiating an authentication protocol according to an example embodiment.

Referring to FIG. 16, at step 1606 the UE 1600 may send an HTTP request toward the BSF 1602. In some embodiments, when a TMPI associated with the IMPI in use may be available on the UE 1600, the UE 1600 may include this TMPI in the "username" parameter. When a TMPI is not available, the UE may include the IMPI. The UE 1600 may indicate (e.g., to the BSF 1602) the supported authentication protocols, for example, by including a "product" token to the "User-Agent" header. The "product" token format may be "3gpp-gba-type".

At 1608, the BSF 1602 may recognize (e.g., from the structure of the "username" parameter) whether a TMPI and/or an IMPI was sent. If a TMPI was sent, the BSF 1602 may look up the corresponding IMPI (e.g., in its local database). If the BSF 1602 does not find an IMPI corresponding to the received TMPI, it may return an appropriate error message to the UE 1600. The UE 1600 may delete the TMPI and may retry the request, for example, using the IMPI. The BSF 1602 may select (e.g., based on an operator's policy bootstrapping protocol from the list of the UE supported GBA protocols) and may retrieve the complete set of GBA user security settings and/or one or more authentication vectors for the selected protocol. The security settings and/or the authentication vectors may be retrieved from the Operator's Policy server 1604 (e.g., HSS/HLR) over the reference point Zh. If the BSF 1602 is unable to select an authentication protocol, it may rely on the protocol selected by the policy server 1604 (e.g., HSS/HLR). If none of the GBA authentication protocols that the UE 1600 supports may be acceptable to the BSF 1602, the GBA bootstrapping may be terminated, for example, with an appropriate error message. The HSS/HLR may decide which AV to use, for example, based on its policy in conjunction with the user subscription. For example, in embodiments in which the UE may be equipped with a UICC comprising both the SIM and USIM applications it may default to USIM. In embodiments in which the UICC may be GBA aware it may run GBA_U automatically.

At step 1610, BSF 1602 may forward the 401 message to the UE 1600. The message may comprise the selected protocol and/or a nonce challenge. The message may demand that the UE 1600 authenticate itself. At 1612, the UE 1600 may run the selected authentication protocol and/or may check the nonce, for example, to verify that the challenge may be from an authorized network. According to an embodiment, the UE 1600 may also calculate session keys and/or RES. Step 1612 may result in session keys in BSF 1602 and/or the UE 1600. At step 1614, the UE 1600 may send another HTTP request, comprising the Digest response (e.g., calculated using RES), to the BSF 1602. The BSF 1602 may authenticate the UE 1600, for example, by verifying the Digest response (step 1616). The BSF 1602 may generate key material (Ks) based on the AV received from the HSS/HLR (e.g., Ks=CK|IK) at step 1618. The B-TID value may be generated in a format of NAI, for example, to bind key material with a UE identity. At step 1620, the BSF 1602 may send a 200 OK message (e.g., including a B-TID) to the UE 1600. The message may indicate the success of the authentication. The BSF 1602 may supply the lifetime of the key Ks in the 200 OK message. The key material Ks may be generated in the UE (e.g., Ks=CK|IK). In step 1622, the UE 1600 and/or the BSF 1602 may use the Ks to derive the key material Ks_NAF, for example, that may be used for securing the reference point Ua. The UE 1600 and the BSF 1602 may store the key Ks with the associated B-TID for further use, until the lifetime of Ks has expired, until the key Ks is updated, and/or until the deletion conditions are satisfied.

Figure 17:
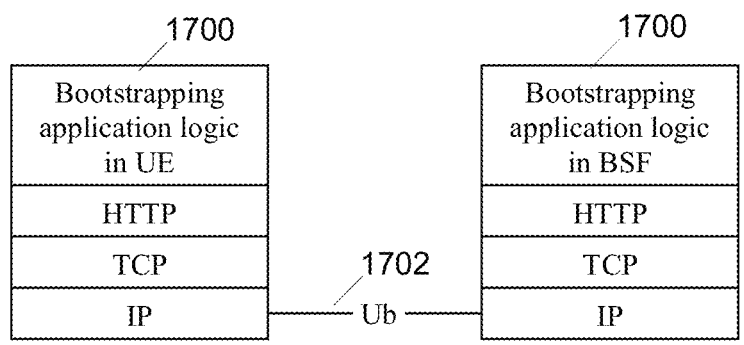
FIG. 17 shows an exemplary protocol stack of a Ub interface.

In accordance with embodiments described herein, a UE may indicate to a BSF the supported authentication protocols over a Ub reference point, for example, by including a "product" token to the "User-Agent" header. The "product" token may take the following string values, for example: "3gpp-gba-me-usim" (e.g., UICC is not GBA aware and the UE uses USIM AKA); "3gpp-gba-me-isim" (e.g., UICC is not GBA aware and UE uses ISIM AKA); "3gpp-gba-me-sim" (e.g., UICC is not GBA aware and UE uses SIM AKA); "3gpp-gba-uicc-usim" (e.g., UICC is GBA aware and UE uses USIM AKA); "3gpp-gba-uicc-isim" (e.g., UICC is GBA aware and UE uses ISIM AKA); "3gpp-gba-uicc-sim" (e.g., UICC is GBA aware UE uses SIM AKA); "3gpp-gba-sip-digest" (e.g., non-UICC credentials using SIP Digest); and "3gpp-gba-http-digest" (e.g., non-UICC credentials using HTTP digest). The User-Agent header field, with a list of authentication protocols supported by the UE in the "product" token for example, may be ordered according to UE and/or operator configured policy. In an embodiment, upon receiving a "product" token, the application server (e.g., BSF) may decide and may select an authentication protocol to use, for example, to authenticate the UE using a GBA-based authentication protocol. An exemplary protocol stack 1200 of a Ub interface 1202 in an exemplary bootstrapping protocol is illustrated in FIG. 17.

As described herein, the initial negotiated protocol between the UE and NAF may be resolved with respect to the bootstrapping that may be employed (e.g., through user subscription and/or network policy). For example, the NAF may comprise a policy that indicates whether or not it accepts subscribers using SIP digest credentials. In some embodiments, user subscription and/or network policy may supersede an authentication protocol that may be negotiated between the UE and BSF, for example, if such as authentication protocol is inconsistent with policy. Such superseding may depend on the overall decision structure that is implemented.

A Zn reference point may be implemented between a BSF and an NAF. According to an embodiment shown in the FIG. 18, the Zn interface 1808 may enable GBA bootstrapping protocol negotiation and/or selection. FIG. 18 shows an example embodiment of GBA bootstrapping protocol negotiations. At step 1810, the UE 1800 may start protocol Ua 1806, for example, by sending its identity (UE-Id) and/or the prioritized list of supported GBA bootstrapping protocols. If one or more of the protocols are acceptable to the NAF 1802, at step 1812, the NAF 1802 may start protocol Zn 1808 with BSF 1804, for example, by sending UE-Id, NAF-Id, and/or a list of UE supported GBA protocols. The NAF may (e.g., if it can accept all of the GBA protocols on the list) send the complete list, or it may send a list of the GBA protocol and/or protocols (e.g., from the received list) it accepts. If none of the protocols on the list is acceptable to the NAF 1802, it may send an appropriate error message to the UE 1800 and the protocol may be terminated. At 1814, the BSF 1804 may check the UE-Id, NAF-Id, and/or the GBA authentication protocols list supplied by the NAF 1802. The BSF 1804 may select (e.g., based on operator's policy) the GBA authentication protocol. At 1816, the BSF 1804 may send (e.g., over Zn interface 1808), to the NAF 1802, a message comprising private UE identity (IMPI) and/or the selected GBA authentication protocol. In an example embodiment in which none of the GBA protocols on the list is acceptable to the BSF 1804, the BSF 1804 may send an appropriate error message to the NAF 1802. At 1818, the NAF 1802 may continue protocol Ua 1806 with the UE 1800, for example, by indicating to the UE 1800 the acceptable GBA authentication protocol. In an embodiment in which no GBA authentication protocol may be acceptable, an appropriate error message may be returned. As described herein, the initial negotiated protocol between the UE 1800 and NAF 1802 may be resolved with respect to the bootstrapping that may be employed. In some embodiments, user subscription and/or network policy may supersede an authentication method that may be negotiated between the NAF and BSF. Such superseding may depend on the overall decision structure that is implemented.

Figure 19:
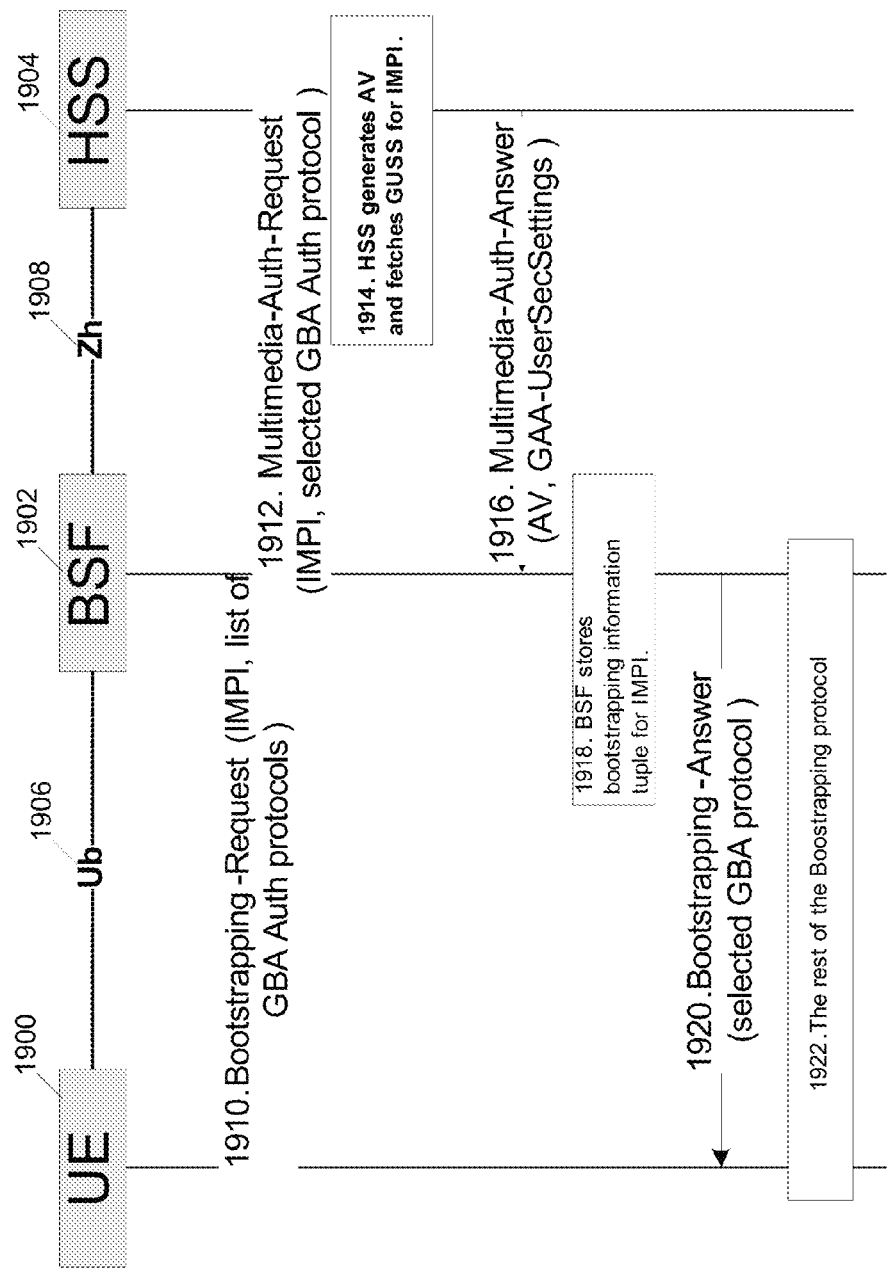
FIG. 19 illustrates another example embodiment of a message flow for GBA bootstrapping protocol negotiations.

A Zh interface may be implemented between a BSF and an operator's policy server (e.g., HSS/HLR). FIG. 19 illustrates an example call flow according to an embodiment in which the Zh interface 1908 may enable GBA bootstrapping protocol negotiation and/or selection with a HSS 1904. At 1910, the UE 1900 may start protocol Ub 1906, for example, by sending its identity (IMPI) and/or the prioritized list of supported GBA bootstrapping protocols. At 1912, the BSF 1902 may start protocol Zh 1908 with the HSS 1904 by sending IMPI and/or the selected GBA Authentication protocol. In an embodiment in which the BSF 1902 may not be able to select a GBA protocol, it may set the protocol to "unknown" and/or may rely on the HSS 1904 to select the protocol. For example, the HSS 1904 may select the protocol based on the user profile stored in the HSS 1904. According to an embodiment, the HSS 1904 may know which protocol to use based on the subscriber identity and/or network policy. In such an embodiment in which the BSF 1904 indicates that the protocol is "unknown" and the HSS 1904 does not select a protocol, the BSF 1902 may send an appropriate error message to the UE 1900. At 1914, the HSS 1904 may generate AVs for the selected GBA Authentication protocol. At 1916, the HSS 1904 may supply (e.g., to the BSF 1902) the requested authentication vector and/or GUSS (e.g., if any). At 1918, the BSF 1902 may store the AV information received for the IMPI. At step 1920, the BSF 1902 may indicate to the UE 1900 the acceptable GBA protocol. The UE 1900 and the BSF 1902 may continue the bootstrapping protocol over the Ub interface 1906, at 1922.

According to an example embodiment, the results of the negotiations described herein may have the potential of being in conflict with each other. Accordingly, in example embodiments, conflicts may be reconciled and/or avoided. For example, configurations may be rated from highest to lowest security. An example rating order, based on general mobility security considerations, may be: (1) The UE has a GBA aware UICC; (2) The UE has a GBA unaware UICC; and (3) The UE does not possess a UICC or UICC is present but not accessible.

In an example embodiment, selection may require that a policy be in force, for example, which stipulates that the selected boot-strapping protocol be associated with at least the minimum level of security allowed by the NAF. For example, such a policy may be enforceable from the user and/or operator level or from the level of one of the entities involved (e.g., UE, BSF, NAF, HSS) in authentication. In an embodiment with such a policy, the UE-NAF negotiation may ultimately determine what bootstrapping may be used. In one example scenario, the minimum security level allowed by the NAF may be less than or equal to the capability of the UE. For example, if the UE is capable of comprising a GBA aware UICC and the NAF allows a UE that does not possess a UICC (or UICC is present but not accessible), then the UE and NAF may be free to negotiate according to any of possible UE capabilities mentioned above. For example, in such a scenario, GBA_U, GBA_ME or GBA_Digest may be possible. Alternatively, if the NAF insists on the security level associated with a UE comprising a GBA aware UICC, then GBA_U may be required.

In another example scenario, the minimum security level allowed by the NAF may be greater than the UE capability. In such a scenario, an error message may be sent to the UE from the NAF, for example, as part of the initial negotiation, and no bootstrapping may take place.

The example embodiments discussed above may avoid resolving potential conflicts that could arise if two or more of the negotiations (e.g., BSF-NAF, UE-BSF, etc.) take place within a given authentication protocol. In an example embodiment, the UE-NAF negotiation may be considered. For example, more complex reconciliations of selection methods may be required if multiple negotiations were allowed to take place. Reconciliations involving decision making intelligence in, for example, the BSF may resolve negotiation conflicts. Such decision making intelligence may reside in the HSS, in the NAF, in the UE, in the BSF, or in a combination thereof.

As previously discussed herein, FIG. 7 illustrates an example embodiment of a protocol flow for negotiation and selection of user authentication protocols and/or credentials for Single Sign-On (SSO) scenarios. In an example embodiment, a NAF may function as an SSO Identity Provider (IdP). For example, the NAF may be denoted in this scenario as NAF/IdP and/or OP (e.g., in an OpenID context). The negotiation may use standard protocols and/or tools such as OpenID Provider Authorization Policy Extension (PAPE) and/or HTTP for example. Although described herein with reference to the OpenID protocol, other protocols such as Liberty Alliance. The configurations considered with respect to FIG. 7 may comprise the UE, the NAF/IdP (web server), and/or the service provider, which may be referred to as the relying party (RP). Various conditions may be imposed on these entities. For example, the UE may be a subscriber to the wireless services of a mobile network operator (MNO). The NAF/IdP, for example, may facilitate authentication selection under several variants.

In an example embodiment, the NAF/IdP may function under policy control of the MNO. In another example embodiment, the NAF/IdP may function as an OP and may or may not be under the policy control of the MNO. The OP and RP may communicate authentication preferences with the OpenID Protocol Extension (e.g., with PAPE messaging). The OP may apply its own policies in requesting that the UE may authenticate using a certain protocol.

Referring to FIG. 7, an exemplary SSO protocol flow (e.g., using OpenID) is illustrated. At 706, the UE/user 700 may visit an RP 704 and may provide an OpenID identifier to the RP 704, and the UE/user 700 may indicate that it supports GBA-based authentication. At 708, the RP 704 may decide, based on the provided OpenID identifier and the GBA authentication hint, for example, which specific protocol(s) of user authentication that the RP 704 may prefer and/or characteristics of authentication protocols(s) that the RP 704 may prefer. At steps 712 and 714, the RP 704 may redirect the UE 700 to an OpenID server 702 with integrated NAF (NAF/OP), for example, to initiate the OpenID protocol with the NAF/OP. The RP 704 may use the PAPE to request the desired authentication protocols and/or credentials. At 716, the NAF/OP 702 and the RP 704 may want to 'negotiate' according to the OpenID extensions, for example, to determine whether protocols offered by the RP 704 may be acceptable to the NAF/OP 702. If more than one protocol is acceptable, the GBA authentication protocol negotiation may be performed (e.g., as described herein), and a protocol may be selected (e.g., via a policy). If no protocols are acceptable, for example, the NAF may send an error message to the RP 704 and the RP 704 may inform the UE/user 700 (e.g., and the OpenID SSO) to no longer proceed. At 718, the NAF/OP 702 may engage in the OpenID authentication with the UE/user 700 (e.g., using the selected protocol). In the authentication, the NAF/OP 702 and the UE 700 may want to re-negotiate the selected authentication protocol, for example, according to whether or whether not the UE 700 supports the protocol. For example, the NAF/OP 702 may know which protocols are supported, and/or the UE 700 may want to inform the NAF/OP 702 which protocols of authentication the UE supports. At step 720, the UE 700 may authenticate using the selected protocol or the negotiated protocol and/or credentials. At 722, the OP may assert the identity, and may redirect the user back to the RP 704. The message may comprise the signed assertion message and may comprise (e.g., based on the OpenID extensions) the authentication protocol and/or additional information, such as time of last authentication for example. At step 724, the RP 704 may decide whether the reported protocol matches the requested protocol. The RP 704 may also determine whether another protocol has been selected between the OP 702 and UE 700.

Figure 20A:
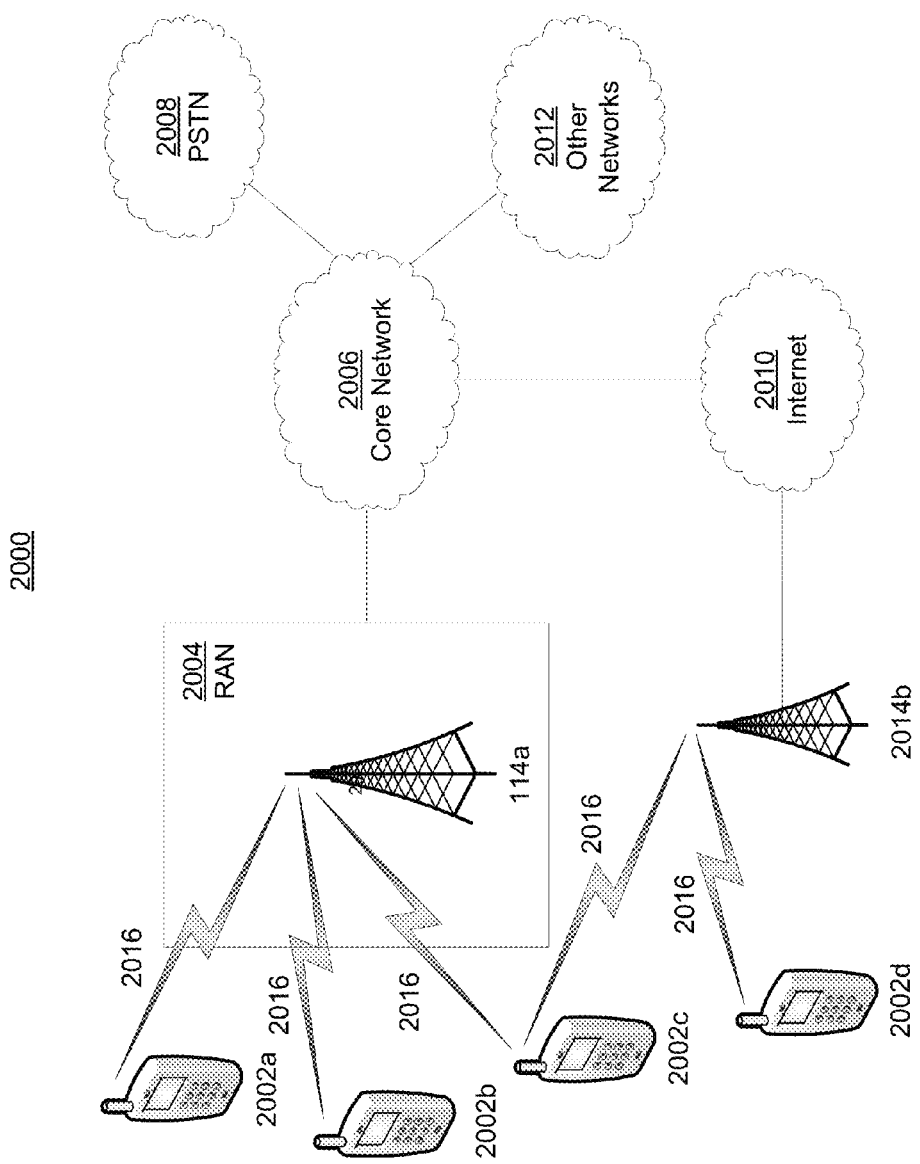
FIG. 20A is a system diagram of an example communications system in which one or more disclosed embodiments may be implemented.

FIG. 20A is a diagram of an example communications system 2000 in which one or more disclosed embodiments may be implemented. The communications system 2000 may be a multiple access system that provides content, such as voice, data, video, messaging, broadcast, etc., to multiple wireless users. The communications system 2000 may enable multiple wireless users to access such content through the sharing of system resources, including wireless bandwidth. For example, the communications systems 2000 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 20A, the communications system 2000 may include wireless transmit/receive units (WTRUs) 2002a, 2002b, 2002c, 2002d, a radio access network (RAN) 2004, a core network 2006, a public switched telephone network (PSTN) 2008, the Internet 2010, and other networks 2012, though it will be appreciated that the disclosed embodiments contemplate any number of WTRUs, base stations, networks, and/or network elements. Each of the WTRUs 2002a, 2002b, 2002c, 2002d may be any type of device configured to operate and/or communicate in a wireless environment. By way of example, the WTRUs 2002a, 2002b, 2002c, 2002d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 2000 may also include a base station 2014a and a base station 2014b. Each of the base stations 2014a, 2014b may be any type of device configured to wirelessly interface with at least one of the WTRUs 2002a, 2002b, 2002c, 2002d to facilitate access to one or more communication networks, such as the core network 2006, the Internet 2010, and/or the networks 2012. By way of example, the base stations 2014a, 2014b may be a base transceiver station (BTS), a Node-B, an eNode B, a Home Node B, a Home eNode B, a site controller, an access point (AP), a wireless router, and the like. While the base stations 2014a, 2014b are each depicted as a single element, it will be appreciated that the base stations 2014a, 2014b may include any number of interconnected base stations and/or network elements.

The base station 2014a may be part of the RAN 2004, which may also include other base stations and/or network elements (not shown), such as a base station controller (BSC), a radio network controller (RNC), relay nodes, etc. The base station 2014a and/or the base station 2014b may be configured to transmit and/or receive wireless signals within a particular geographic region, which may be referred to as a cell (not shown). The cell may further be divided into cell sectors. For example, the cell associated with the base station 2014a may be divided into three sectors. Thus, in one embodiment, the base station 2014a may include three transceivers, i.e., one for each sector of the cell. In another embodiment, the base station 2014a may employ multiple-input multiple output (MIMO) technology and, therefore, may utilize multiple transceivers for each sector of the cell.

The base stations 2014a, 2014b may communicate with one or more of the WTRUs 2002a, 2002b, 2002c, 2002d over an air interface 2016, which may be any suitable wireless communication link (e.g., radio frequency (RF), microwave, infrared (IR), ultraviolet (UV), visible light, etc.). The air interface 2016 may be established using any suitable radio access technology (RAT).

More specifically, as noted above, the communications system 2000 may be a multiple access system and may employ one or more channel access schemes, such as CDMA, TDMA, FDMA, OFDMA, SC-FDMA, and the like. For example, the base station 2014a in the RAN 2004 and the WTRUs 2002a, 2002b, 2002c may implement a radio technology such as Universal Mobile Telecommunications System (UMTS) Terrestrial Radio Access (UTRA), which may establish the air interface 2016 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 2014a and the WTRUs 2002a, 2002b, 2002c may implement a radio technology such as Evolved UMTS Terrestrial Radio Access (E-UTRA), which may establish the air interface 2016 using Long Term Evolution (LTE) and/or LTE-Advanced (LTE-A).

In other embodiments, the base station 2014a and the WTRUs 2002a, 2002b, 2002c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 2014b in FIG. 20A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 2014b and the WTRUs 2002c, 2002d may implement a radio technology such as IEEE 802.11 to establish a wireless local area network (WLAN). In another embodiment, the base station 2014b and the WTRUs 2002c, 2002d may implement a radio technology such as IEEE 802.15 to establish a wireless personal area network (WPAN). In yet another embodiment, the base station 2014b and the WTRUs 2002c, 2002d may utilize a cellular-based RAT (e.g., WCDMA, CDMA2000, GSM, LTE, LTE-A, etc.) to establish a picocell or femtocell. As shown in FIG. 20A, the base station 2014b may have a direct connection to the Internet 2010. Thus, the base station 2014b may not be required to access the Internet 2010 via the core network 2006.

The RAN 2004 may be in communication with the core network 2006, which may be any type of network configured to provide voice, data, applications, and/or voice over internet protocol (VoIP) services to one or more of the WTRUs 2002a, 2002b, 2002c, 2002d. For example, the core network 2006 may provide call control, billing services, mobile location-based services, pre-paid calling, Internet connectivity, video distribution, etc., and/or perform high-level security functions, such as user authentication. Although not shown in FIG. 20A, it will be appreciated that the RAN 2004 and/or the core network 2006 may be in direct or indirect communication with other RANs that employ the same RAT as the RAN 2004 or a different RAT. For example, in addition to being connected to the RAN 2004, which may be utilizing an E-UTRA radio technology, the core network 2006 may also be in communication with another RAN (not shown) employing a GSM radio technology.

The core network 2006 may also serve as a gateway for the WTRUs 2002a, 2002b, 2002c, 2002d to access the PSTN 2008, the Internet 2010, and/or other networks 2012. The PSTN 2008 may include circuit-switched telephone networks that provide plain old telephone service (POTS). The Internet 2010 may include a global system of interconnected computer networks and devices that use common communication protocols, such as the transmission control protocol (TCP), user datagram protocol (UDP) and the internet protocol (IP) in the TCP/IP internet protocol suite. The networks 2012 may include wired or wireless communications networks owned and/or operated by other service providers. For example, the networks 2012 may include another core network connected to one or more RANs, which may employ the same RAT as the RAN 2004 or a different RAT.

Some or all of the WTRUs 2002a, 2002b, 2002c, 2002d in the communications system 2000 may include multi-mode capabilities, i.e., the WTRUs 2002a, 2002b, 2002c, 2002d may include multiple transceivers for communicating with different wireless networks over different wireless links. For example, the WTRU 2002c shown in FIG. 20A may be configured to communicate with the base station 2014a, which may employ a cellular-based radio technology, and with the base station 2014b, which may employ an IEEE 802 radio technology.

Figure 20B:
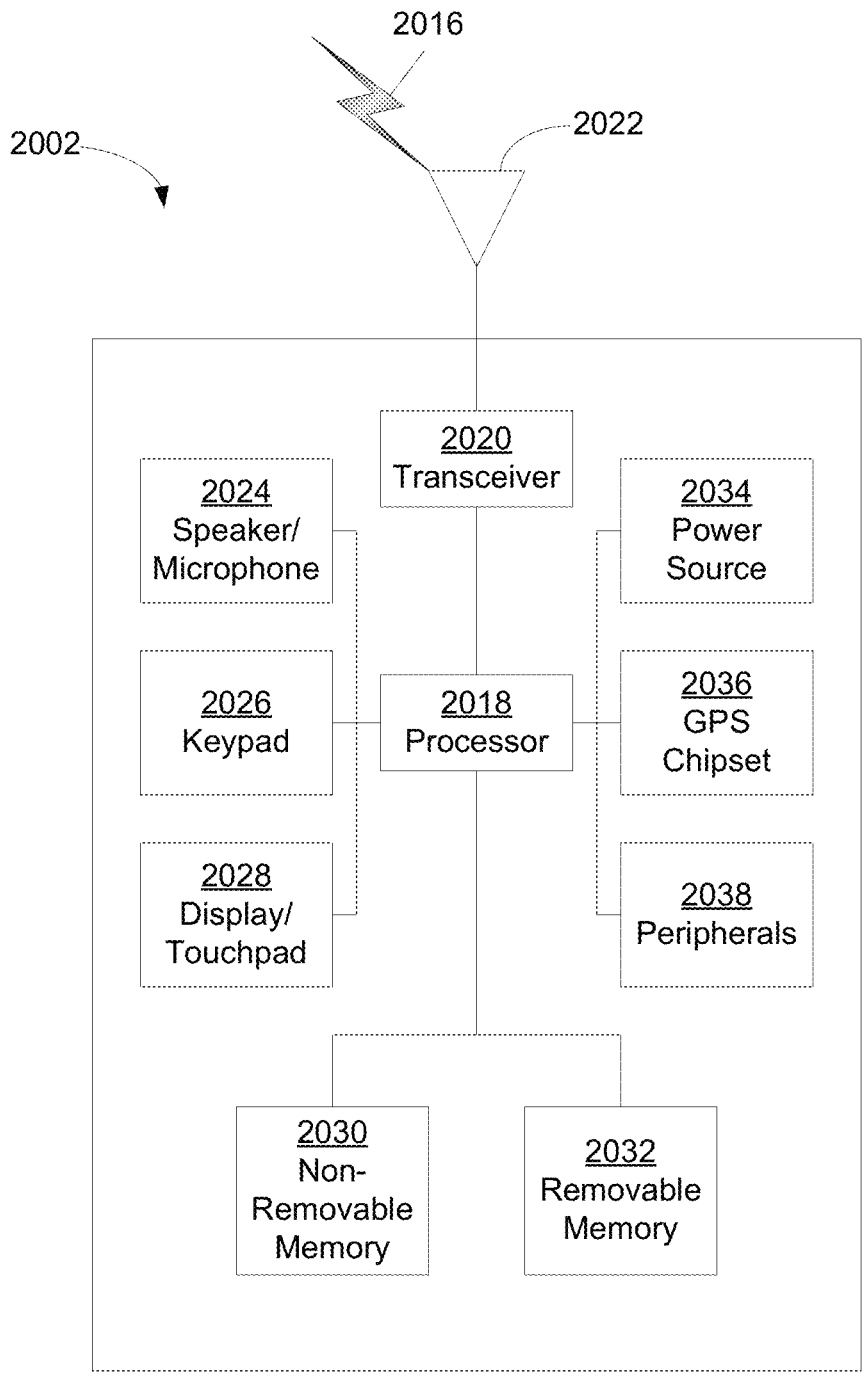
FIG. 20B is a system diagram of an example wireless transmit/receive unit (WTRU) that may be used within the communications system illustrated in FIG. 20A.

FIG. 20B is a system diagram of an example WTRU 2002. As shown in FIG. 20B, the WTRU 2002 may include a processor 2018, a transceiver 2020, a transmit/receive element 2022, a speaker/microphone 2024, a keypad 2026, a display/touchpad 2028, non-removable memory 2030, removable memory 2032, a power source 2034, a global positioning system (GPS) chipset 2036, and other peripherals 2038. It will be appreciated that the WTRU 2002 may include any sub-combination of the foregoing elements while remaining consistent with an embodiment.

The processor 2018 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 2018 may perform signal coding, data processing, power control, input/output processing, and/or any other functionality that enables the WTRU 2002 to operate in a wireless environment. The processor 2018 may be coupled to the transceiver 2020, which may be coupled to the transmit/receive element 2022. While FIG. 20B depicts the processor 2018 and the transceiver 2020 as separate components, it will be appreciated that the processor 2018 and the transceiver 2020 may be integrated together in an electronic package or chip.

The transmit/receive element 2022 may be configured to transmit signals to, or receive signals from, a base station (e.g., the base station 2014a) over the air interface 2016. For example, in one embodiment, the transmit/receive element 2022 may be an antenna configured to transmit and/or receive RF signals. In another embodiment, the transmit/receive element 2022 may be an emitter/detector configured to transmit and/or receive IR, UV, or visible light signals, for example. In yet another embodiment, the transmit/receive element 2022 may be configured to transmit and receive both RF and light signals. It will be appreciated that the transmit/receive element 2022 may be configured to transmit and/or receive any combination of wireless signals.

In addition, although the transmit/receive element 2022 is depicted in FIG. 20B as a single element, the WTRU 2002 may include any number of transmit/receive elements 2022. More specifically, the WTRU 2002 may employ MIMO technology. Thus, in one embodiment, the WTRU 2002 may include two or more transmit/receive elements 2022 (e.g., multiple antennas) for transmitting and receiving wireless signals over the air interface 2016.

The transceiver 2020 may be configured to modulate the signals that are to be transmitted by the transmit/receive element 2022 and to demodulate the signals that are received by the transmit/receive element 2022. As noted above, the WTRU 2002 may have multi-mode capabilities. Thus, the transceiver 2020 may include multiple transceivers for enabling the WTRU 2002 to communicate via multiple RATs, such as UTRA and IEEE 802.11, for example.

The processor 2018 of the WTRU 2002 may be coupled to, and may receive user input data from, the speaker/microphone 2024, the keypad 2026, and/or the display/touchpad 2028 (e.g., a liquid crystal display (LCD) display unit or organic light-emitting diode (OLED) display unit). The processor 2018 may also output user data to the speaker/microphone 2024, the keypad 2026, and/or the display/touchpad 2028. In addition, the processor 2018 may access information from, and store data in, any type of suitable memory, such as the non-removable memory 2030 and/or the removable memory 2032. The non-removable memory 2030 may include random-access memory (RAM), read-only memory (ROM), a hard disk, or any other type of memory storage device. The removable memory 2032 may include a subscriber identity module (SIM) card, a memory stick, a secure digital (SD) memory card, and the like. In other embodiments, the processor 2018 may access information from, and store data in, memory that is not physically located on the WTRU 2002, such as on a server or a home computer (not shown).

The processor 2018 may receive power from the power source 2034, and may be configured to distribute and/or control the power to the other components in the WTRU 2002. The power source 2034 may be any suitable device for powering the WTRU 2002. For example, the power source 2034 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 2018 may also be coupled to the GPS chipset 2036, which may be configured to provide location information (e.g., longitude and latitude) regarding the current location of the WTRU 2002. In addition to, or in lieu of, the information from the GPS chipset 2036, the WTRU 2002 may receive location information over the air interface 2016 from a base station (e.g., base stations 2014a, 2014b) and/or determine its location based on the timing of the signals being received from two or more nearby base stations. It will be appreciated that the WTRU 2002 may acquire location information by way of any suitable location-determination method while remaining consistent with an embodiment.

The processor 2018 may further be coupled to other peripherals 2038, which may include one or more software and/or hardware modules that provide additional features, functionality and/or wired or wireless connectivity. For example, the peripherals 2038 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 20C:
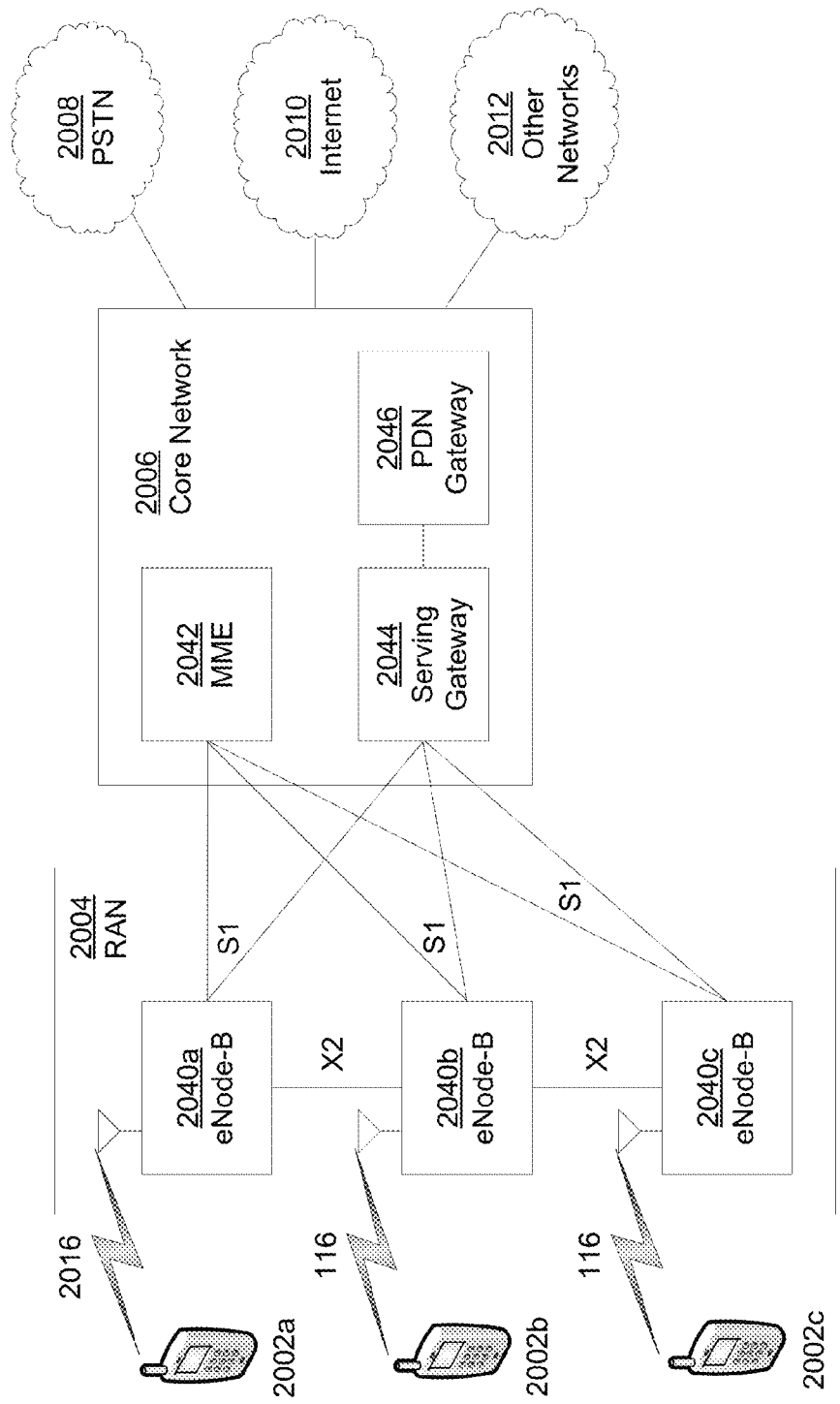
FIG. 20C is a system diagram of an example radio access network and an example core network that may be used within the communications system illustrated in FIG. 20A.

FIG. 20C is a system diagram of the RAN 2004 and the core network 2006 according to an embodiment. As noted above, the RAN 2004 may employ an E-UTRA radio technology to communicate with the WTRUs 2002a, 2002b, 2002c over the air interface 2016. The RAN 2004 may also be in communication with the core network 2006.

The RAN 2004 may include eNode-Bs 2040a, 2040b, 2040c, though it will be appreciated that the RAN 2004 may include any number of eNode-Bs while remaining consistent with an embodiment. The eNode-Bs 2040a, 2040b, 2040c may each include one or more transceivers for communicating with the WTRUs 2002a, 2002b, 2002c over the air interface 2016. In one embodiment, the eNode-Bs 2040a, 2040b, 2040c may implement MIMO technology. Thus, the eNode-B 2040a, for example, may use multiple antennas to transmit wireless signals to, and receive wireless signals from, the WTRU 2002a.

Each of the eNode-Bs 2040a, 2040b, 2040c may be associated with a particular cell (not shown) and may be configured to handle radio resource management decisions, handover decisions, scheduling of users in the uplink and/or downlink, and the like. As shown in FIG. 20C, the eNode-Bs 2040a, 2040b, 2040c may communicate with one another over an X2 interface.

The core network 2006 shown in FIG. 20C may include a mobility management gateway (MME) 2042, a serving gateway 2044, and a packet data network (PDN) gateway 2046. While each of the foregoing elements are depicted as part of the core network 2006, it will be appreciated that any one of these elements may be owned and/or operated by an entity other than the core network operator.

The MME 2042 may be connected to each of the eNode-Bs 2042a, 2042b, 2042c in the RAN 2004 via an S1 interface and may serve as a control node. For example, the MME 2042 may be responsible for authenticating users of the WTRUs 2002a, 2002b, 2002c, bearer activation/deactivation, selecting a particular serving gateway during an initial attach of the WTRUs 2002a, 2002b, 2002c, and the like. The MME 2042 may also provide a control plane function for switching between the RAN 2004 and other RANs (not shown) that employ other radio technologies, such as GSM or WCDMA.

The serving gateway 2044 may be connected to each of the eNode Bs 2040a, 2040b, 2040c in the RAN 2004 via the S1 interface. The serving gateway 2044 may generally route and forward user data packets to/from the WTRUs 2002a, 2002b, 2002c. The serving gateway 2044 may also perform other functions, such as anchoring user planes during inter-eNode B handovers, triggering paging when downlink data is available for the WTRUs 2002a, 2002b, 2002c, managing and storing contexts of the WTRUs 2002a, 2002b, 2002c, and the like.

The serving gateway 2044 may also be connected to the PDN gateway 2046, which may provide the WTRUs 2002a, 2002b, 2002c with access to packet-switched networks, such as the Internet 2010, to facilitate communications between the WTRUs 2002a, 2002b, 2002c and IP-enabled devices.

The core network 2006 may facilitate communications with other networks. For example, the core network 2006 may provide the WTRUs 2002a, 2002b, 2002c with access to circuit-switched networks, such as the PSTN 2008, to facilitate communications between the WTRUs 2002a, 2002b, 2002c and traditional land-line communications devices. For example, the core network 2006 may include, or may communicate with, an IP gateway (e.g., an IP multimedia subsystem (IMS) server) that serves as an interface between the core network 2006 and the PSTN 2008. In addition, the core network 2006 may provide the WTRUs 2002a, 2002b, 2002c with access to the networks 2012, which may include other wired or wireless networks that are owned and/or operated by other service providers.

Although the example embodiments described herein are carried out in the context of OpenID, the techniques described above may be applied to any number of single sign-on security protocols, such as Liberty Alliance. Additionally, while the various embodiments have been described in connection with the various figures, it is to be understood that other similar embodiments may be used or modifications and additions may be made to the described embodiment for performing the same function of the various embodiments without deviating there from. Therefore, the embodiments should not be limited to any single embodiment, but rather should be construed in breadth and scope in accordance with the appended claims.

Moreover features and elements are described above in particular combinations, and each feature or element may be used alone or in any combination with the other features and elements. It is understood that any or all of the systems, methods and processes described herein may be embodied in the form of computer or processor executable instructions (i.e., program code, software and/or firmware) stored on a computer-readable storage medium which instructions, when executed by a machine, such as a processor, perform and/or implement the systems, methods and processes described herein. Specifically, any of the steps, operations or functions described above may be implemented in the form of such executable instructions. Computer readable storage media include both volatile and nonvolatile, removable and non-removable media implemented in any method or technology for storage of information. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by a computer or processor.

What is claimed:

1. In a system comprising a user equipment (UE), a service provider (SP) that comprises a Network Access Function (NAF), and an authentication end point (AEP) that comprises a Bootstrapping Server Function (BSF) which communicate via a network that implements a Generic Bootstrapping Architecture, a method of authenticating the UE by the AEP, comprising, at the AEP: receiving a request from the UE for access to a service provided by the SP;
   determining one or more authentication protocols that are supported by the UE; negotiating with the UE to select one of the authentication protocols that are acceptable to the SP and that are supported by the UE;
   and authenticating the UE using the selected authentication protocol, wherein based on the received request, an association of a shared secret key may be established.

2. The method recited in claim 1, further comprising:
   determining one or more authentication protocols and that are acceptable to the SP, wherein determining the one or more authentication protocols acceptable to the SP comprises negotiating with the SP to determine the one or more acceptable authentication protocols.

3. The method recited in claim 2, wherein determining one or more authentication protocols acceptable to the SP comprises:
   receiving one or more characteristics from the SP; and
   determining the acceptable protocols that comprise the one or more characteristics.

4. The method recited in claim 2, wherein determining one or more authentication protocols acceptable to the SP comprises retrieving the one or more acceptable authentication protocols from a database accessible to the AEP that stores information concerning acceptable authentication protocols for one or more service providers.

5. The method recited in claim 1, further comprising:
   receiving from the UE an identification of one or more authentication protocols or credentials supported by the UE.

6. The method recited in claim 1, the method further comprising, at the BSF:
   receiving, from the UE, a request to run a GBA digest protocol; and
   in response to the request, requesting and retrieving an authentication vector from a policy server.

7. The method recited in claim 6, wherein the NAF comprises a policy indicating whether to accept subscribers using SIP Digest credentials.

8. The method recited in claim 1, wherein the network further implements an OpenID federated identity management architecture, and wherein the AEP further comprises an Identity Provider (IdP).

9. In a system comprising a user equipment (UE), a service provider (SP) that comprises a Network Access Function (NAF), and an authentication end point (AEP) that comprises a Bootstrapping Server Function (BSF) which communicate via a network that implements a Generic Bootstrapping Architecture (GBA), a method of authenticating the UE by the AEP, comprising, at the SP: receiving a request from the UE to access a service provided by the SP;
   determining one or more authentication protocols supported by the UE such that the one or more authentication protocols can be used to authenticate the UE;
   providing, to the AEP, information concerning authentication protocols acceptable to the SP;
   and receiving from the UE a signed assertion message indicating authentication of the UE in accordance with a selected authentication protocol, wherein based on the received request, an association of a shared secret key may be established.

10. In a system comprising a user equipment (UE), a service provider (SP) that comprises a Network Access Function (NAF), and an authentication end point (AEP) that comprises a Bootstrapping Server Function (BSF) which communicate via a network that implements a Generic Bootstrapping Architecture (GBA), a method of authenticating the UE, comprising, at the UE:
    sending a request to the SP for access to a service provided by the SP;
    negotiating with the AEP to select one of a plurality of authentication protocols that are acceptable to the SP and that are supported by the UE, and receiving from the AEP an indication of the result of authentication of the UE in accordance with the selected authentication protocol, wherein based on the received request, an association of a shared secret key may be established.

11. The method recited in claim 10, wherein the indication comprises a signed assertion message comprising the result of authentication of the UE in accordance with the selected authentication protocol, the method further comprising:
    forwarding, by the UE, the signed assertion message to the SP.

12. The method recited in claim 10, wherein the indication from the AEP comprises a key that results from an authentication of the UE in accordance with the selected authentication protocol.

13. The method recited in claim 10, wherein the network further implements an OpenID federated identity management architecture, and wherein the AEP further comprises an Identity Provider (IdP).

14. The method recited in claim 10, further comprising:
    receiving, via the NAF, a bootstrapping initiation message comprising a realm attribute to trigger the UE to run a bootstrapping protocol using the selected authentication protocol.

15. The method recited in claim 10, further comprising, at the UE:
    providing an indication to the NAF that one or more GBA authentication protocols are supported by the UE; and
    receiving an indication, from the NAF, that one of the one or more GBA authentication protocols are acceptable, wherein the acceptable GBA authentication protocol comprises a SIP Digest-based GBA security association.

16. The method recited in claim 14, further comprising:
    if none of the one or more GBA authentication protocols that are supported by the UE are acceptable to the NAF, receiving, at the UE, an error message, thereby terminating GBA bootstrapping.

17. The method of claim 15, wherein the request for access to a service comprises a product token in a user agent header, wherein the product token indicates that the UE requests the use of a GBA Digest protocol.

18. The method of claim 17, wherein, in response to the request for access,
    receiving a code 401 response, wherein the code 401 response comprises a prefix in a header, wherein the prefix indicates that the UE is allowed to perform the GBA Digest protocol.

* * * * *